(12) United States Patent
Ide et al.

(10) Patent No.: US 10,909,855 B2
(45) Date of Patent: Feb. 2, 2021

(54) DRIVING SUPPORT APPARATUS

(71) Applicant: TOYOTA JIDOSHA KABUSHIKI KAISHA, Toyota (JP)

(72) Inventors: Hirohito Ide, Chofu (JP); Shota Fujii, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 199 days.

(21) Appl. No.: 16/141,520

(22) Filed: Sep. 25, 2018

(65) Prior Publication Data

US 2019/0096258 A1   Mar. 28, 2019

(30) Foreign Application Priority Data

Sep. 27, 2017   (JP) ................. 2017-185839

(51) Int. Cl.
   G08G 1/16     (2006.01)
   B62D 15/02    (2006.01)
   G08G 1/01     (2006.01)

(52) U.S. Cl.
   CPC ........... *G08G 1/167* (2013.01); *B62D 15/025* (2013.01); *B62D 15/0255* (2013.01); *G08G 1/0112* (2013.01)

(58) Field of Classification Search
   CPC .... G08G 1/167; G08G 1/0112; B62D 15/025; B62D 15/0255; B60W 30/08; B60W 30/12; B60W 40/06
   See application file for complete search history.

(56) References Cited

U.S. PATENT DOCUMENTS

| 2005/0270145 | A1  | 12/2005 | Kataoka et al. |
| 2006/0025918 | A1  | 2/2006  | Saeki |
| 2014/0249722 | A1* | 9/2014  | Hegemann ............. G08G 1/166 701/41 |
| 2017/0061799 | A1  | 3/2017  | Fujii et al. |
| 2018/0348779 | A1* | 12/2018 | Oniwa ............... G06K 9/00798 |

FOREIGN PATENT DOCUMENTS

| JP | 2005138647 A | 6/2005 |
| JP | 2005343303 A | 12/2005 |
| JP | 2006044326 A | 2/2006 |
| JP | 2006315491 A | 11/2006 |
| JP | 2007253820 A | 10/2007 |

(Continued)

*Primary Examiner* — Michael V Kerrigan
(74) *Attorney, Agent, or Firm* — Hunton Andrews Kurth LLP

(57) ABSTRACT

A driving support apparatus for a vehicle includes a lane keeping assist control unit configured to perform a lane keeping assist control, and a lane change assist control unit configured to perform a lane change assist control. When a reliability with respect to a recognition result of lane lines is a predetermined level, the lane keeping assist control unit lowers a responsiveness of the lane keeping assist control, compared with the responsiveness of the lane keeping assist control when the reliability is a level higher than the predetermined level. When the reliability is a level lower than the predetermined level, the lane change assist control unit lowers a responsiveness of the lane change assist control, compared with the responsiveness of the lane change assist control when the reliability is the predetermined level.

2 Claims, 9 Drawing Sheets

(56) References Cited

FOREIGN PATENT DOCUMENTS

| | | | |
|---|---|---|---|
| JP | 2008195402 | A | 8/2008 |
| JP | 4172434 | B2 | 10/2008 |
| JP | 2009190464 | A | 8/2009 |
| JP | 4349210 | B2 | 10/2009 |
| JP | 2010006279 | A | 1/2010 |
| JP | 4929777 | B2 | 5/2012 |
| JP | 2014148293 | A | 8/2014 |
| JP | 2016218649 | A | 12/2016 |
| JP | 2017047765 | A | 3/2017 |
| JP | 2017074823 | A | 4/2017 |

\* cited by examiner

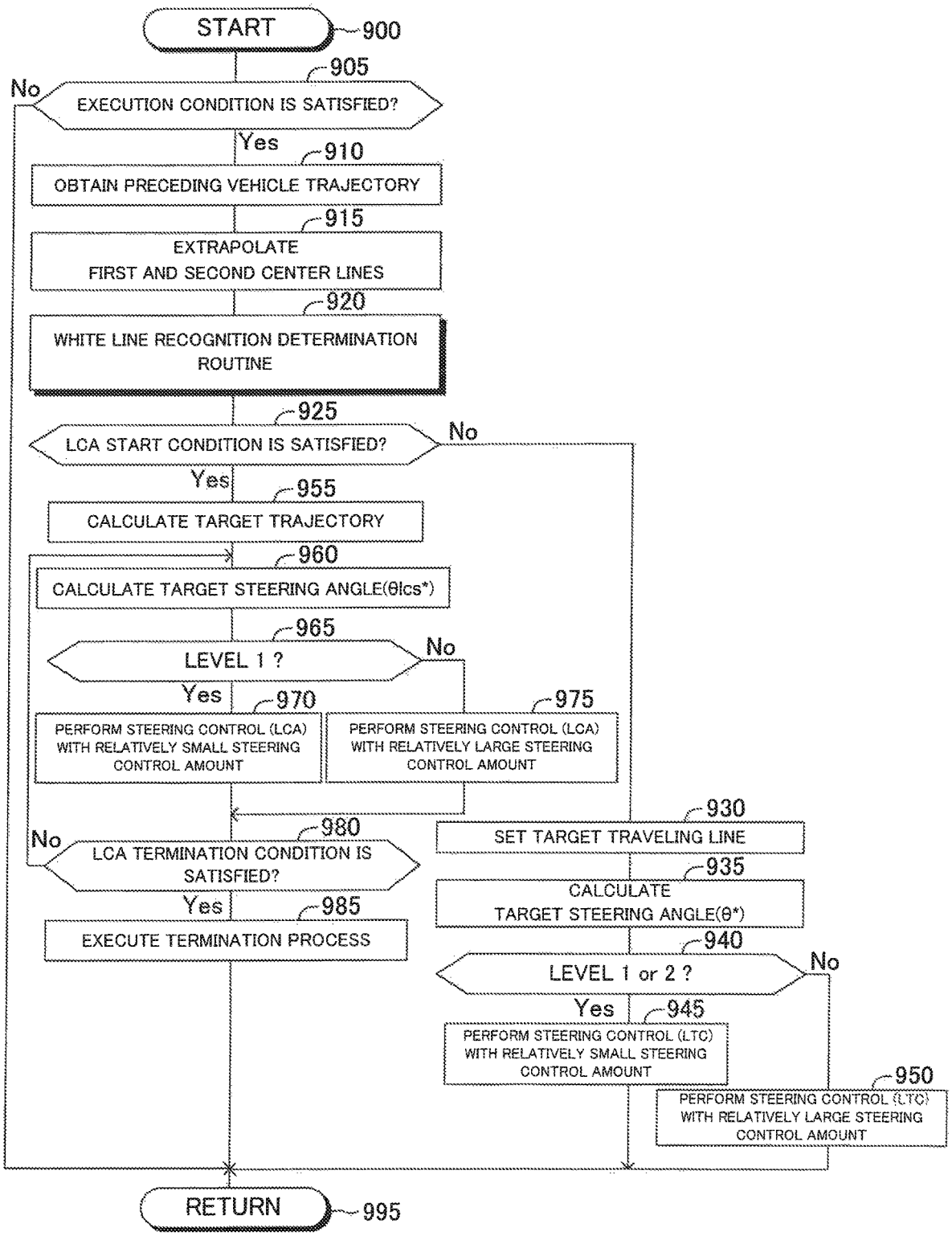

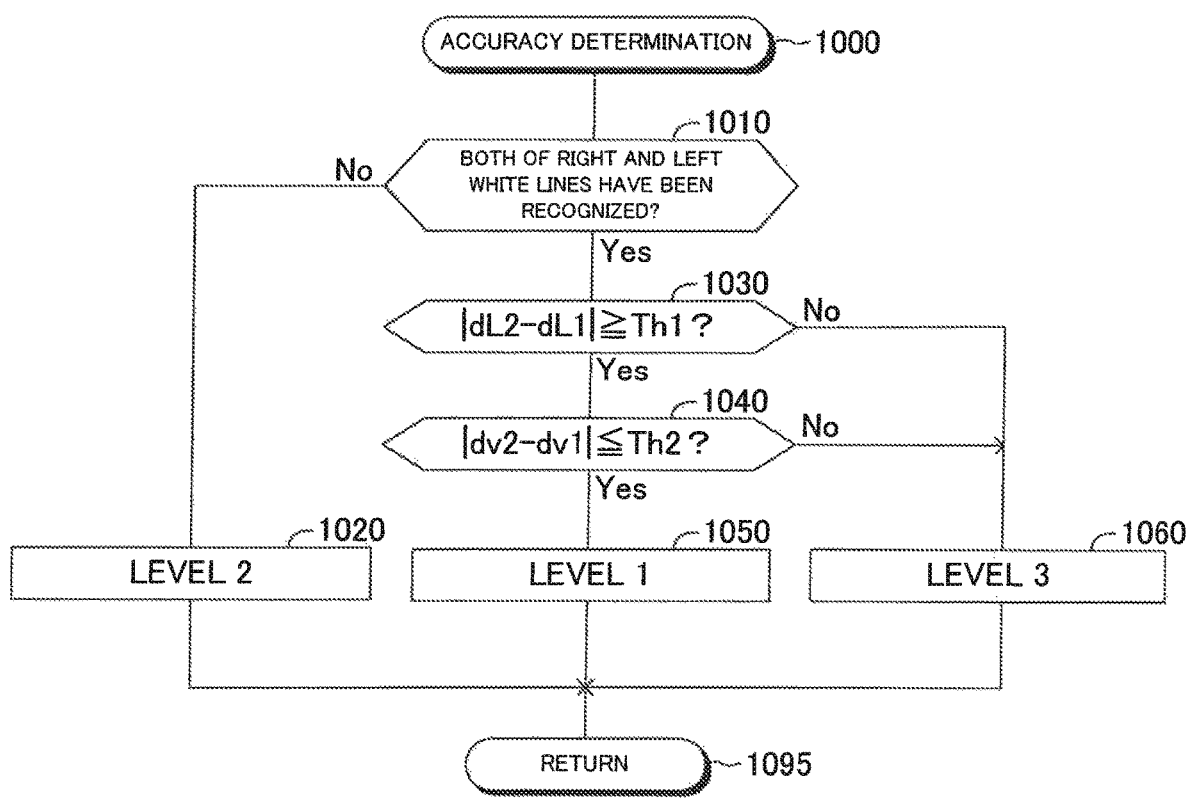

DRIVING SUPPORT APPARATUS

CROSS-REFERENCE TO RELATED APPLICATION

The present application claims priority to Japanese Patent Application No. 2017-185839 filed on Sep. 27, 2017, which is incorporated herein by reference in its entirety.

BACKGROUND

1. Technical Field

The present disclosure relates to a driving support apparatus for a vehicle configured to support/assist a lane change of the vehicle from "a lane (original lane) in which the vehicle is currently traveling" to "an adjacent lane (target lane) adjacent to the original lane".

2. Description of the Related Art

One of driving support apparatuses (hereinafter, referred to as a "related-art apparatus 1") that are conventionally known performs a lane keeping assist control for changing a steering angle of an own vehicle by utilizing a pair of lane lines (lane traffic lines, or lane markers) painted at both of right and left sides on a road in such a manner that the own vehicle travels at an appropriate position within "a travel lane (original lane) defined/specified by a pair of the lane lines" (for example, see Japanese Patent Application Laid-Open (kokai) 2016-218649 A). Hereinafter, the lane line is referred to as a "white line", for convenience.

Another driving support apparatus (hereinafter, referred to as a "related-art apparatus 2") determines whether or not a driver wishes/intends to change lanes based on an operation state of a turn signal lever during execution of the lane keeping assist control. When the related-art apparatus 2 determines that the driver wishes to change lanes, the related-art apparatus 2 performs a lane change assist control for changing the steering angle of the own vehicle in such a manner that the own vehicle moves (changes lanes) from the original lane to the target lane (for example, see Japanese Patent Application Laid-Open (kokai) 2017-47765 A).

In order to have the own vehicle travel within the original lane stably, when it is determined that the reliability of a recognition result of the white lines is low, the related-art apparatus 1 performs the lane keeping assist control in such a manner that a (magnitude of) steering control amount (for example, a target steering angle) is limited so as not to become larger than an upper limit value. When the steering control amount is limited so as to be equal to or smaller than the upper limit value, a responsiveness of control for having the own vehicle come close to a target traveling line (i.e., appropriate position) is lowered. Hereinafter, the recognition result of the white lines is referred to as a "white line recognition result", for convenience.

Meanwhile, the related-art apparatus 2 recognizes white lines which define the original lane and the target lane, and performs the lane change assist control based on information on the recognized white lines. However, when the related-art apparatus 2 performs the lane change assist control, a situation/case may occur in which the reliability of the white line recognition result becomes low. If the lane change is performed in such a situation, for example, the accuracy of a target position in the target lane set/determined based on the recognized white lines (e.g., a center position in a lane-width direction of the target lane) also becomes low. Therefore, there is a possibility that the own vehicle cannot be moved to an appropriate position in the target lane. However, the related-art apparatus 2 does not perform an appropriate control in accordance with the reliability of the white line recognition result.

In view of the above, regarding the lane change assist control that is started during execution of the lane keeping assist control, the inventors of the present application conducted a study on a case in which the steering control amount is limited by an upper limit value in accordance with the reliability of the recognized white lines. For example, when performing the lane change assist control, it is conceivable to impose a limit on the steering control amount when the reliability of the white line recognition result is low, as in the same manner as the lane keeping assist control.

The "situation in which the reliability of the white line recognition result is low" may include various situations such as a situation in which only one of the left and right white lines has been recognized, and a situation in which the white line(s) has been misrecognized. In performing the lane keeping assist control, it seems to be preferable to impose a limitation on the steering control amount so as not to exceed the upper limit value in all of the above-mentioned situations in order to prevent the own vehicle from suddenly moving in the lane-width direction within the original lane. However, in performing the lane change assist control, it is not necessarily appropriate to impose a limitation on the steering control amount using the upper limit value for all of the above-mentioned situations from the viewpoint of safely moving the own vehicle from the original lane to the target lane, as follows Setting the upper limit value on the steering control amount lengthens a time period required for a lane change (that is, a time period for which the own vehicle moves from a position at the start of the lane change to the target position in the target lane). Therefore, the time period required for a lane change becomes longer than a predetermined time period (hereinafter, referred to as a "predetermined target lane change time period"). For example, in a case in which the target lane is a fast lane (overtaking lane), an other vehicle may approach the own vehicle at a high speed from a rear area of the own vehicle in the fast lane. Thus, if the time period required for changing lanes becomes longer, there is a risk that the other vehicle comes excessively close to the own vehicle while the own vehicle is changing lanes. Therefore, even when the reliability of the white line recognition result is low, it is preferable to perform the lane change assist control without setting the upper limit value on the steering control amount, depending on the situation, In view of the above, the inventors have found that it is desirable that a criterion to determine whether to limit the steering control amount in the lane change assist control (that is, lowering the responsiveness of control) be different from a criterion to determine whether to limit the steering control amount in the lane keeping assist control.

SUMMARY

One or more embodiments have been devised in view of the above-mentioned problem. Specifically, there is provided a driving support apparatus which can suitably set a criterion (criterion relating to the reliability with respect to the recognition result of the lane lines) to determine whether to lower the responsiveness of control (follow-up responsiveness) in each of the lane keeping assist control and the lane change assist control.

According to one embodiment, there is provided a driving support apparatus for a vehicle, including:

a lane line recognition unit (10, 10a, 16) configured to recognize a pair of lane lines (LL, RL) which define a travel lane in which an own vehicle is traveling, and a pair of lane lines (RL, RR) which define an adjacent lane which is adjacent to the travel lane, and to extrapolate a first center line (LM1) connecting center positions between the pair of the lane lines of the traveling line, and a second center line (LM2) connecting center positions between the pair of the lane lines of the adjacent lane;

a determination unit (10, 10f) configured to determine a reliability with respect to a recognition result of a pair of the lane lines of the travel lane;

a lane keeping assist control unit (10, 10d, 40) configured to perform a lane keeping assist control for changing a steering angle of the own vehicle in such manner that the own vehicle travels along a target traveling line which is set based on at least the first center line; and a lane change assist control unit (10, 10e, 40) configured to perform a lane change assist control for changing the steering angle of the own vehicle in such a manner that the own vehicle changes lanes from the travel lane to the adjacent lane along a target trajectory which is set based on the first center line and the second center line.

Further, when the reliability determined by the determination unit is a predetermined level (Level 2), the lane keeping assist control unit is configured to lower a responsiveness of the lane keeping assist control for having a position of the own vehicle and a direction of the own vehicle match up with the target traveling line (Step 940:Yes, Step 945), compared with the responsiveness of the lane keeping assist control when the reliability is a level (Level 3) higher than the predetermined level.

When the reliability determined by the determination unit is a level (Level 1) lower than the predetermined level (Level 2), the lane change assist control unit is configured to lower a responsiveness of the lane change assist control for having the position of the own vehicle and the direction of the own vehicle match up with the target trajectory (Step 965:Yes, Step 970), compared with the responsiveness of the lane change assist control when the reliability is the predetermined level (Level 2).

In performing the lane keeping assist control, in response to the level (that is, "white line recognition level") of the reliability with respect to the recognition result of the lane lines (white lines), the driving support apparatus lowers the responsiveness (steering control amount) of the lane keeping assist control for/when having the position of the own vehicle and the direction of the own vehicle match up with (become equal to) the target traveling line. More specifically, for example, when the reliability with respect to the recognition result of the lane lines is the predetermined level (e.g., Level 2), the driving support apparatus lowers the responsiveness of the lane keeping assist control, compared with the responsiveness of the lane keeping assist control when the reliability is a level (e.g., Level 3) higher than the predetermined level. Further, in performing the lane change assist control, in response to the level of the reliability with respect to the recognition result of the lane lines, the driving support apparatus lowers the responsiveness (steering control amount) of the lane change assist control for/when having the position of the own vehicle and the direction of the own vehicle match up with (become equal to) the target trajectory. More specifically, for example, when the reliability is the level (e.g., Level 1) lower than the predetermined level (e.g., Level 2), the driving support apparatus lowers the responsiveness of the lane change assist control, compared with the responsiveness of the lane change assist control when the reliability is the predetermined level (e.g., Level 2). In this manner, in the driving support apparatus, a threshold (that is, white line recognition level) for lowering the responsiveness of the lane change assist control is set to a level lower than the level for lowering the responsiveness of the lane keeping assist control. When the reliability is the predetermined level (e.g., Level 2), the driving support apparatus does not lower the responsiveness of the lane change assist control. Therefore, the driving support apparatus can have the own vehicle change lanes from the travel lane to the adjacent lane within a time period close to the predetermined target lane change time period. Accordingly, the driving support apparatus can reduce the possibility that an other vehicle traveling at a high speed in the adjacent lane (target lane) in a rear area of the own vehicle comes excessively close to the own vehicle. As a result, the safety in the lane change assist control can be further enhanced. Further, when the reliability is the predetermined level (e.g., Level 2), the driving support apparatus lowers the responsiveness of the lane keeping assist control. Therefore, the own vehicle can be made to travel along the travel lane stably.

In an aspect of the driving support apparatus, when the lane line recognition unit has misrecognized one or both of a pair of the lane lines of the travel lane, the determination unit is configured to determine that the reliability is a first level (Step 1010:Yes, Step 1030:Yes, Step 1040:Yes, Step 1050).

Further, when the lane line recognition unit has recognized only one of a pair of the lane lines of the travel lane, the determination unit is configured to determine that the reliability is a second level (Step 1010:No, Step 1020).

In addition, when the lane line recognition unit has correctly recognized a pair of the lane lines of the travel lane, the determination unit is configured to determine that the reliability is a third level (Step 1010:Yes, Step 1030:No, Step 1040:No, Step 1060).

Further, when the determination unit determines that the reliability is the first level or the second level, the lane keeping assist control unit is configured to lower the responsiveness of the lane keeping assist control for having the position of the own vehicle and the direction of the own vehicle match up with the target traveling line, compared with the responsiveness of the lane keeping assist control when the determination unit determines that the reliability is the third level (Step 940:Yes, Step 945).

When the determination unit determines that the reliability is the first level, the lane change assist control unit is configured to lower the responsiveness of the lane change assist control for having the position of the own vehicle and the direction of the own vehicle match up with the target trajectory, compared with the responsiveness of the lane change assist control when the determination unit determines that the reliability is the second level or the third level (Step 965:Yes, Step 970).

The determination unit according to the present aspect classifies the reliability with respect to the recognition result of the lane lines into three levels (the following three white line recognition levels). The first level is a white line recognition level in a situation in which one or both of the pair of the lane lines of the travel lane has/have been misrecognized. The second level is a white line recognition level in a situation in which only one of a pair of the lane lines of the travel lane has been recognized. The third level is a white line recognition level in a situation in which a pair of the lane lines of the travel lane have been correctly recognized. When the reliability is the first level, the lane change assist control unit according to the present aspect lowers the responsiveness of the lane change assist control, compared with the responsiveness of the lane change assist control when the reliability is the second level or the third level. Therefore, even in the situation (that is, "second level") in which only one of a pair of the lane lines of the travel lane has been recognized, the responsiveness of the lane change assist control is not lowered. Thus, in the situation in which only one of a pair of the lane lines of the travel lane has been recognized, the own vehicle can be made to change lanes from the travel lane to the adjacent lane within a time period close to the predetermined target lane change time period. Therefore, the driving support apparatus according to the present aspect can reduce the possibility that an other vehicle traveling at a high speed in the adjacent lane (target lane) and approaching from behind the own vehicle comes excessively close to the own vehicle.

An aspect of the driving support apparatus further includes a preceding vehicle trajectory obtaining unit (10, 10c) configured to extrapolate a traveling trajectory of a preceding vehicle traveling in the travel lane and ahead of the own vehicle.

While the lane keeping assist control is being performed, the determination unit is configured to determine the reliability (Step 1030, Step 1040) based on:

one or both of (i) a first distance change amount ($|dL2-dL1|$) which is a magnitude of change amount of a distance in a lane-width direction between the first center line and the own vehicle in a first predetermined time period, and (ii) a first angle change amount ($|\theta L2-\theta L1|$) which is a magnitude of change amount of an angle of deviation formed between a direction of the first center line and a traveling direction of the own vehicle in a second predetermined time period; and one or both of (i) a second distance change amount ($|dv2-dv1|$) which is a magnitude of change amount of a distance in the lane-width direction between the traveling trajectory and the own vehicle in the first predetermined time period, and (ii) a second angle change amount ($|\theta v2-\theta v1|$) which is a magnitude of change amount of an angle of deviation formed between a direction of the traveling trajectory and the traveling direction of the own vehicle in the second predetermined time period.

The determination unit according to the present aspect determines the reliability with respect to the recognition result of the lane lines of the travel lane based on:

one or both of the first distance change amount ($|dL2-dL1|$) and the first angle change amount ($|\theta L2-\theta L1|$); and one or both of the second distance change amount ($|dv2-dv1|$) and the second angle change amount ($|\theta v2-\theta v1|$).

Therefore, when the position in the lane-width direction of the own vehicle is changed, the determination unit can accurately determine whether or not a pair of the lane lines of the travel lane has been misrecognized (details will be described later).

In the above description, in order to facilitate understanding of the above one or more aspect of the embodiment, a name and/or reference numeral used in embodiments described below is enclosed in parentheses and assigned to each of the constituent features corresponding to the embodiments. However, each of the constituent features is not limited to the embodiments defined by the name and/or reference numeral.

BRIEF DESCRIPTION OF THE DRAWINGS

FIG. 5A is a plan view for explaining the lane keeping assist control of FIG. 4 in more detail.

FIG. 5B shows expressions for explaining a relationship between coefficients of a cubic function of the preceding vehicle trajectory, a curvature of the cubic function, a radius of curvature of the cubic function, and the like.

FIG. 5C shows expressions for explaining a relationship between the coefficients of the cubic function of the preceding vehicle trajectory, the curvature of the cubic function, a yaw angle, and the like.

FIG. 9 is a flowchart for illustrating a routine executed by a driving support ECU according to the embodiment.

FIG. 10 is a flowchart for illustrating a "white line recognition accuracy determination routine" executed by the driving support ECU according to the embodiment.

DETAILED DESCRIPTION OF THE EMBODIMENTS

Figure 1:
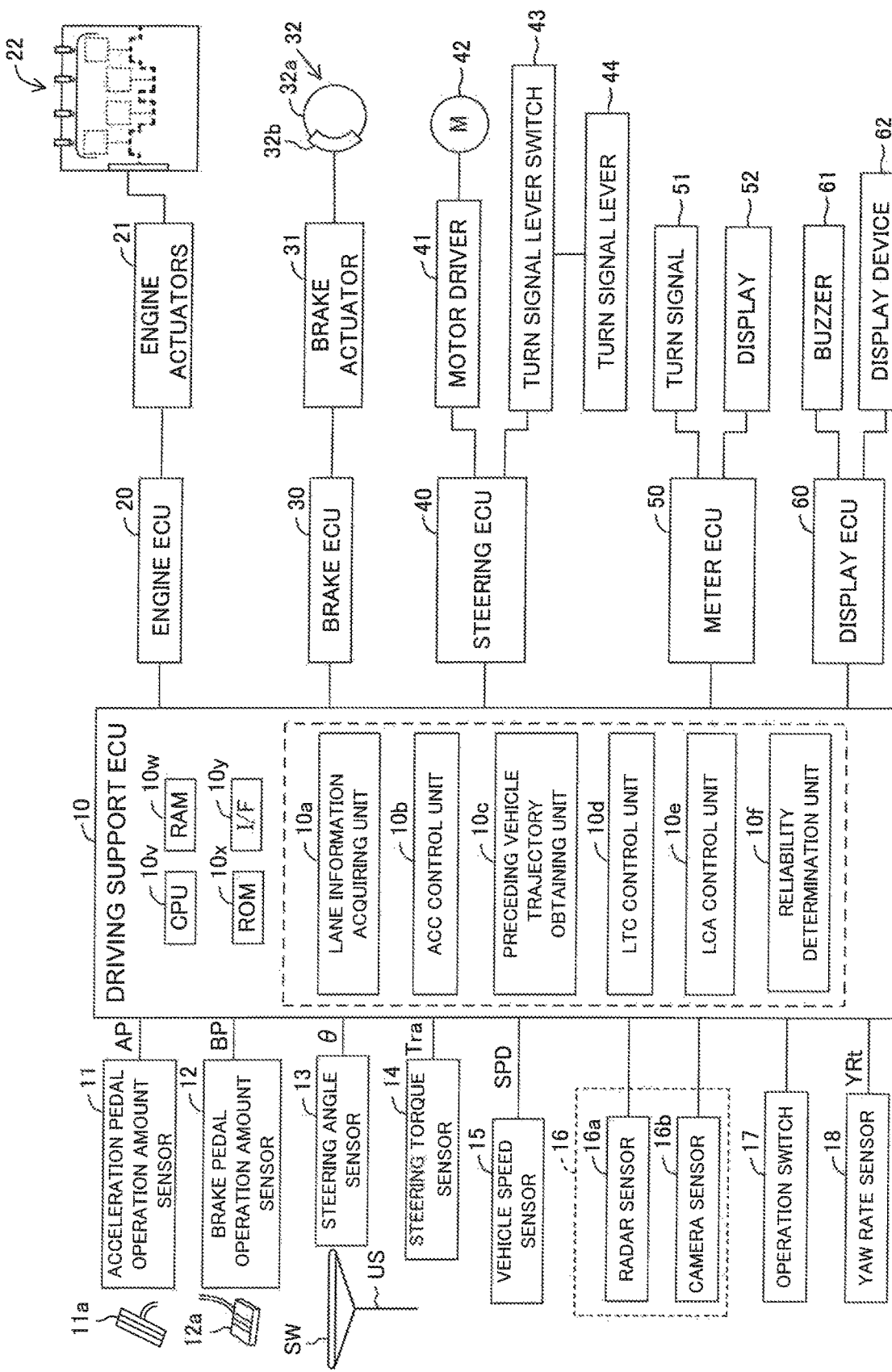
FIG. 1 is a schematic configuration diagram for illustrating a driving support apparatus for a vehicle according to an embodiment.

Referring to the accompanying drawings, a description is given of embodiments. The accompanying drawings are illustrations of one or more specific embodiments in conformity with the principle thereof, but those illustrations are examples to be used for the understanding of the embodiment(s), and are not to be used to limit the interpretation of the present disclosure.

<Configuration>

A driving support apparatus (hereinafter referred to as an "embodiment apparatus") according to an embodiment is applied to a vehicle (hereinafter also referred to as an "own vehicle" in order to distinguish from other vehicles). The embodiment apparatus includes a driving support (assist) ECU 10, an engine ECU 20, a brake ECU 30, a steering ECU 40, a meter ECU 50, and a display ECU 60.

Those ECUs are electric control units each including a microcomputer as a main part, and are connected to one another so as to be able to mutually transmit and receive information via a controller area network (CAN) (not shown). The microcomputer herein includes a CPU, a RAM, a ROM, an interface I/F, and the like. For example, the driving support ECU 10 includes a microcomputer including a CPU 10v, a RAM 10w, a ROM 10x, an interface I/F 10y, and the like. The CPU 10v executes instructions (programs and routines) stored in the ROM 10x to realize various functions.

The driving support ECU 10 is electrically connected to sensors including switches described later and receives detection signals or output signals of the sensors, respectively. The sensors may be electrically connected to any of the ECUs other than the driving support ECU 10. In this case, the driving support ECU 10 receives the detection signals or the output signals of the sensors from the ECUs electrically connected to the sensors via the CAN.

An acceleration pedal operation amount sensor 11 detects an operation amount (accelerator opening) AP of an acceleration pedal 11a of the own vehicle and outputs a detection signal or an output signal indicative of the operation amount AP to the driving support ECU 10. A brake pedal operation amount sensor 12 detects an operation amount BP of a brake pedal 12a of the own vehicle and outputs a detection signal or an output signal indicative of the operation amount BP to the driving support ECU 10.

A steering angle sensor 13 detects a steering angle θ of the own vehicle and outputs a detection signal or an output signal indicative of the steering angle θ to the driving support ECU 10. The driving support ECU 10 calculates a steering angular velocity (=dθ/dt) which is a change amount per unit time of the steering angle θ received from the steering angle sensor 13. A steering torque sensor 14 detects a steering torque Tra applied to a steering shaft US of the own vehicle by an operation of a steering wheel SW and outputs a detection signal or an output signal indicative of the steering torque Tra to the driving support ECU 10. A vehicle speed sensor 15 detects a traveling speed SPD of the own vehicle and outputs a detection signal or an output signal indicative of the traveling speed SPD to the driving support ECU 10.

An ambient sensor 16 acquires at least information on a road ahead of the own vehicle and information on three-dimensional objects being present on the road. The three-dimensional objects include, for example, moving objects such as pedestrians, bicycles, vehicles and the like, and motionless objects such as power poles, trees, guardrails and the like. Hereinafter, the three-dimensional object will be referred to as a "target object". The ambient sensor 16 includes a radar sensor 16a and a camera sensor 16b.

The radar sensor 16a transmits radio waves each having a millimeter wave band to an area surrounding the own vehicle including at least an area in front of the own vehicle, and receives radio waves reflected by the target object(s) being present within a radiation range. Hereinafter, the radio wave having the millimeter wave band will be referred to as a "millimeter wave" and the radio wave reflected by the target object will be referred to as a "reflected wave". The radar sensor 16a determines the presence or absence of the target object, calculates parameters representing a relative relationship between the own vehicle and the target object, and outputs the determination results and the calculation results to the driving support ECU 10. The parameters representing the relative relationship between the own vehicle and the target object include a position of the target object with respect to the own vehicle, a distance between the own vehicle and the target object, a relative speed of the target object with respect to the own vehicle, and the like.

Specifically, the radar sensor 16a includes a millimeter wave transmitting/receiving part (not shown) and a signal processing part (not shown). The signal processing part acquires, every time a certain period of time elapses, the parameters representing the relative relationship between the own vehicle and the target object based on a phase difference between the millimeter wave transmitted from the millimeter wave transmitting/receiving part and the reflected wave received by the millimeter wave transmitting/receiving part, a damping level of the received reflected wave with respect to the transmitted millimeter wave, a time from the transmission of the millimeter wave to the reception of the reflected wave and the like. The parameters include an inter-vehicle distance (i.e. a longitudinal distance) Dfx(n) of the detected target object(n), a relative vehicle speed Vfx(n) of the target object (n), a lateral distance Dfy(n) of the target object (n), a relative lateral speed Vfy(n) of the target object (n) and the like.

The inter-vehicle distance Dfx(n) is a distance between the own vehicle and the target object (n) (e.g., a preceding vehicle) along a central axis of the own vehicle (central axis extending in the front-rear direction of the own vehicle, that is, the x-axis described later).

The relative vehicle speed Vfx(n) is a difference between a speed Vs of the target object (n) (preceding vehicle) and a speed Vj of the own vehicle (that is, Vfx(n)=Vs−Vj). The speed Vs of the target object (n) is a speed of the target object (n) in the traveling direction of the own vehicle (that is, the x-axis described later).

The lateral distance Dfy(n) is a distance in a direction (that is, the y-axis described later) perpendicular to the central axis of the own vehicle between a central position of the target object (n) (e.g., central position in the vehicle-width direction of the preceding vehicle) and the central axis of the own vehicle. Hereinafter, the lateral distance Dfy(n) will be also referred to as a "lateral position".

The relative lateral speed Vfy(n) is a speed of the central position of the target object (n) (e.g., central position in the vehicle-width direction of the preceding vehicle) in the direction (that is, the y-axis described later) perpendicular to the central axis of the own vehicle.

The camera sensor 16b includes a stereo camera (now shown) and an image processing part (not shown). The stereo camera takes a pair of right and left images of landscapes at a right side of the own vehicle ahead of (in front of) the own vehicle and at a left side of the own vehicle ahead of (in front of) the own vehicle. Based on the pair of right and left images, the image processing part determines the presence or absence of the target object, calculates the parameters representing the relative relationship between the own vehicle and the target object, and outputs the determination results and the calculation results to the driving support ECU 10. In this configuration, the driving support ECU 10 obtains/determines/defines the parameters representing the relative relationship between the own vehicle and the target object by synthesizing the following (i) and (ii):

(i) the parameters acquired by the radar sensor 16a, which represent the relative relationship between the own vehicle and the target object, and (ii) the parameters acquired by the camera sensor 16b, which represent the relative relationship between the own vehicle and the target object.

The camera sensor 16b recognizes right and left lane lines of the road(s) (including a lane (original lane) on which the own vehicle is traveling and an adjacent lane adjacent to the original lane) based on the pair of right and left images. The camera sensor 16b calculates a shape of the road and a positional relationship between the road and the own vehicle (e.g., a distance between the central position in the vehicle-width direction of the own vehicle and a left or right edge of the original lane), and outputs the calculation results to the driving support ECU 10. The lane line includes a white line, a yellow line and the like. Hereinafter, an example where the lane line is the white line will be described.

Information on the target object which is acquired by the ambient sensor 16 will be referred to as "target object information". The information includes the parameters representing the relative relationship between the own vehicle and the target object. The ambient sensor 16 repeatedly transmits the target object information to the driving support ECU 10 every time a certain sampling period of time elapses. The ambient sensor 16 does not necessarily include both the radar sensor and the camera, but may include only one of the radar sensor and the camera.

An operation switch 17 is a switch which is operated by a driver of the own vehicle. The driver can control an execution of a following-travel inter-vehicle-distance control such as an adaptive cruise control (ACC) described later by operating the operation switch 17. Further, the driver can control an execution of a lane keeping assist control described later by operating the operation switch 17.

A yaw rate sensor 18 detects a yaw rate YRt of the own vehicle and outputs a detection signal or output signal indicative of the yaw rate YRt to the driving support ECU 10.

The engine ECU 20 is electrically connected to engine actuators 21 of the engine 22. The engine actuators 21 include at least a throttle valve actuator (not shown) for changing an opening degree of the throttle valve of the engine 22. The engine ECU 20 can change an engine torque generated by the engine 22 by controlling activations of the engine actuators 21. The engine torque generated by the engine 22 is transmitted to drive wheels (not shown) through a transmission (not shown). Therefore, the engine ECU 20 can control a driving force supplied to the own vehicle (that is, to the drive wheels) by controlling the activations of the engine actuators 21 to thereby change an acceleration or an acceleration state. In a case where the own vehicle is a hybrid vehicle, the engine ECU 20 can control the driving force generated by one or both of "the engine and an electric motor" as the vehicle driving source. In a case where the own vehicle is an electric vehicle (battery vehicle), the engine ECU 20 can control the driving force generated by the electric motor as the vehicle driving source.

The brake ECU 30 is electrically connected to a brake actuator 31. The brake actuator 31 is provided in a hydraulic circuit provided between a master cylinder (not shown) for pressurizing hydraulic oil by a depression force of the brake pedal 12*a* and a friction brake mechanism 32 provided in right and left front and rear wheels of the own vehicle. The brake actuator 31 adjusts a hydraulic pressure supplied to a wheel cylinder (not shown) in each brake caliper 32*b* of the friction brake mechanism 32, depending on a command sent from the brake ECU 30. The wheel cylinder is activated by the hydraulic pressure to press a brake pad (not shown) on the brake disc 32*a*, thereby to generate a friction braking force on the brake disc 32*a*. Therefore, the brake ECU 30 can control an activation of the brake actuator 31 to control the braking force applied to the own vehicle (that is, to the wheels) to thereby change an acceleration or an acceleration state (or deceleration, that is, negative acceleration).

The steering ECU 40 is a control device of a known electric powered steering system and is electrically connected to a motor driver 41. The motor driver 41 is electrically connected to a steering motor 42. The steering motor 42 is assembled in a steering mechanism (not shown) including the steering wheel SW, the steering shaft US connected to the steering wheel SW, a steering gear mechanism (not shown) and the like. The steering motor 42 generates a torque by an electric power supplied from the motor driver 41 and uses the torque to apply a steering assist torque to the steering shaft US to thereby steer the right and left steered wheels. That is, the steering motor 42 can change a steering angle of the own vehicle.

The steering ECU 40 is electrically connected to a turn signal lever switch 43. The turn signal lever switch 43 is a detection switch for detecting an operation position of a turn signal lever 44 which is operated by the driver for working (intermittently flashing) a turn signal 51 described later.

The turn signal lever 44 is mounted in a steering column (not shown). The turn signal lever 44 is configured to be able to be selectively operated at the following two positions in the clockwise operation direction: (i) a first stroke position which is a position at which the turn signal lever 44 is rotated by a predetermined angle from a neutral position in the clockwise operation direction, and (ii) a second stroke position which is a position at which the turn signal lever 44 is rotated by the predetermined angle from the first stroke position in the clockwise operation direction. The turn signal lever 44 is maintained at the first stroke position in the clockwise operation direction as long as the driver holds the turn signal lever 44 at that first stroke position. In a state in which the turn signal lever 44 is in the first stroke position in the clockwise operation direction, when the driver releases his/her hand from the turn signal lever 44, the turn signal lever 44 is automatically returned to the neutral position. When the turn signal lever 44 is in the first stroke position in the clockwise operation direction, the turn signal lever switch 43 outputs to the steering ECU 40 a signal representing that the turn signal lever 44 is being maintained at the first stroke position in the clockwise operation direction.

In a similar manner, the turn signal lever 44 is further configured to be able to be selectively operated at the following two positions in the counterclockwise operation direction: (i) a first stroke position which is a position at which the turn signal lever 44 is rotated by the predetermined angle from the neutral position in the counterclockwise operation direction, and (ii) a second stroke position which is a position at which the turn signal lever 44 is rotated by the predetermined angle from the first stroke position in the counterclockwise operation direction. The turn signal lever 44 is maintained at the first stroke position in the counterclockwise operation direction as long as the driver holds the turn signal lever 44 at that first stroke position. In a state in which the turn signal lever 44 is in the first stroke position in the counterclockwise operation direction, when the driver releases his/her hand from the turn signal lever 44, the turn signal lever 44 is automatically returned to the neutral position. When the turn signal lever 44 is in the first stroke position in the counterclockwise operation direction, the turn signal lever switch 43 outputs to the steering ECU 40 a signal representing that the turn signal lever 44 is being maintained at the first stroke position in the counterclockwise operation direction. The above-mentioned turn signal lever is well known, and is disclosed in Japanese Patent Application Laid-Open (kokai) 2005-138647 A, for example.

The driving support ECU 10 is configured to measure a duration time for which the turn signal lever 44 is maintained/hold at the first stroke position in the clockwise operation direction, based on the signal from the turn signal lever switch 43, Further, when the driving support ECU 10 determines that the measured duration time is equal to or longer than a predetermined assist request confirmation time (e.g., 0.8 seconds), the driving support ECU 10 determines that the driver is requesting a lane change assist for changing lanes toward an adjacent lane on the right side. Hereinafter, the above-mentioned request will be referred to as a "lane change assist request".

The driving support ECU 10 is further configured to measure a duration time for which the turn signal lever 44 is maintained/hold at the first stroke position in the counterclockwise operation direction, based on the signal from the turn signal lever switch 43. Further, when the driving support ECU 10 determines that the measured duration time is equal to or longer than the predetermined assist request confirmation time, the driving support ECU 10 determines that the driver is making the lane change assist request for changing lanes toward an adjacent lane on the left side.

The meter ECU 50 is electrically connected to the right and left turn signals 51 (meaning turn signal lamps and sometimes also referred to as "turn lamps") and a display unit 52.

The meter ECU 50 includes a turn signal drive circuit (not shown). The meter ECU 50 intermittently flashes the right or left turn signal 51 through the turn signal drive circuit in response to the signal from the turn signal lever switch 43, a command from the driving support ECU 10 and the like. For example, while the turn signal lever switch 43 outputs the signal representing that the turn signal lever 44 is maintained at the first stroke position in the counterclockwise operation direction, the meter ECU 50 intermittently flashes the left turn signal 51. While the turn signal lever switch 43 outputs the signal representing that the turn signal lever 44 is maintained at the first stroke position in the clockwise operation direction, the meter ECU 50 intermittently flashes the right turn signal 51.

The display unit 52 is, for example, a multi-information display mounted in front of a driver's seat. The display unit 52 displays various types of information in addition to values measured by meters, for example, a vehicle speed, an engine rotation speed and the like. For example, when the meter ECU 50 receives a display command in accordance with a driving support/assist state from the driving support ECU 10, the meter ECU 50 displays on the display unit 52 a screen instructed through the display command.

The display ECU 60 is electrically connected to a buzzer 61 and a display device 62. The display ECU 60 can perform an attention to the driver by causing the buzzer 61 to generate sounds, in response to a command transmitted from the driving support ECU 10. Further, in response to a command transmitted from the driving support ECU 10, the display ECU 60 can cause the display device 62 to light an attention mark such as a warning lamp and/or to display an attention image, an attention message and an operation state of the driving assist control described later. The display device 62 is a head-up display. However, any type of display unit may be adopted as the display device 62.

<Driving Assist Control>

Next, an outline of control performed by the present embodiment apparatus will be described. The driving support ECU 10 is capable of performing the following driving assist control, according to a driver's request. The driving assist control includes the following-travel inter-vehicle-distance control, the lane keeping assist control, and the lane change assist control. In order to perform these controls, the driving support ECU 10 defines an x-y coordinate system (see FIG. 2). In the x-y coordinate shown in FIG. 2, the center axis extending in the front-rear direction of the own vehicle 100 is defined as the x-axis, the axis perpendicular to the x-axis is defined as the y-axis, and the current position of the own vehicle 100 is defined as the origin (x=0, y=0).

First, a process (specifically, a lane information acquisition process) for acquiring information on the circumstances of the own vehicle 100 which will be described. The information on the circumstances of the own vehicle 100 is necessary for performing the above-mentioned driving assist controls.

Lane Information Acquisition Process

The camera sensor 16b transmits/outputs to the driving support ECU 10 information on white lines which define a travel lane 201 in which the own vehicle is currently traveling. The information on the white lines includes information on a shape of the white line, a type of the white line (solid line or dot line), and the like. Further, the camera sensor 16b transmits/outputs to the driving support ECU 10 information on white lines which define an adjacent lane 202 adjacent to the travel lane 201. When the white line positioned between the travel lane 201 and the adjacent lane 202 is the solid line, the own vehicle 100 is prohibited from crossing that lane to change lanes. On the other hand, when the white line positioned between the travel lane 201 and the adjacent lane 202 is the dot line (the white line drawn intermittently on the road at regular intervals), the own vehicle 100 is allowed to cross that white line to change lanes.

Figure 2:
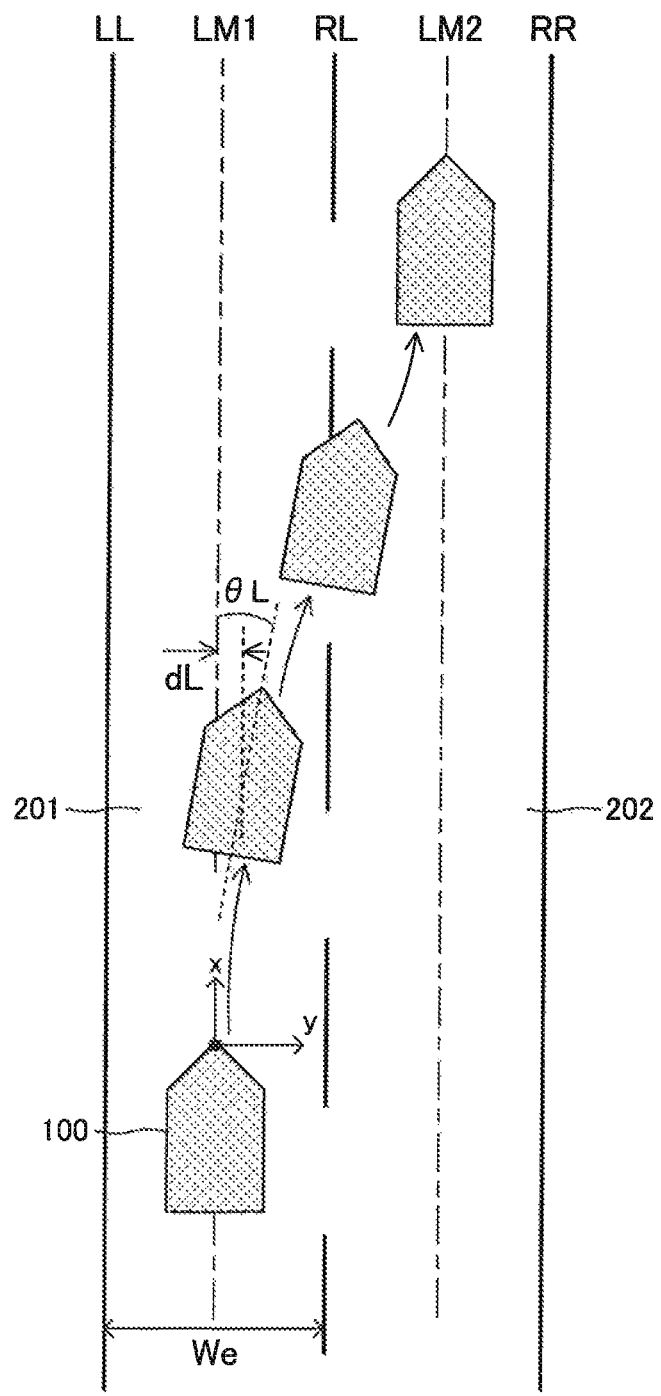
FIG. 2 is a plan view illustrating how the vehicle changes lanes with the lane change assist control.

As illustrated in FIG. 2, the driving support ECU 10 recognizes, based on the information transmitted from the camera sensor 16b, the white lines which define the travel lane (original lane) 201, and the white lines which define the adjacent lane 202. Based on the right and left white lines LL and RL of the recognized travel lane 201, the driving support ECU 10 extrapolates a first center line LM1 through connecting center positions in the road-width direction between the white lines LL and RL of the recognized travel lane 201. Further, based on the right and left white lines RL and RR of the recognized adjacent lane 202, the driving support ECU 10 extrapolates a second center line LM2 through connecting center positions in the road-width direction between the white lines RL and RR of the recognized adjacent lane 202. The first center line LM1 and/or the second center line LM2 are/is used for performing the lane keeping assist control and the lane change assist control, as described later. Hereinafter, when it is unnecessary to distinguish between the first center line LM1 and the second center line LM2, they are collectively referred to as a "center line LM".

If the driving support ECU 10 recognizes only one of the left white line LL and the right white line RL of the travel lane 201, the driving support ECU 10 extrapolates the center line LM as follows. As illustrated in FIG. 2, when the driving support ECU 10 recognizes both of the "white lines LL and RL" while the own vehicle 100 is traveling in the travel lane 201, the driving support ECU 10 calculates a road width We based on the positions of the white lines LL and RL, and stores the calculated road width We in the RAM. The driving support ECU 10 extrapolates the center line LM by using the road width We stored in the RAM.

It is assumed that the driving support ECU 10 recognizes only the left white line LL of the travel lane 201 at the current time point. In this case, the driving support ECU 10 extrapolates, as the first center line LM1, a line which connects points positioned "0.5° We (=We/2)" away from the left white line LL in the "+" direction of the y-axis. Further, the driving support ECU 10 extrapolates, as the second center line LM2, a line which connects points positioned "1.5° We" away from the left white line LL in the "+" direction of the y-axis.

In contrast, it is assumed that the driving support ECU 10 recognizes only the right white line RL of the travel lane 201 at the current time point. In this case, the driving support ECU 10 extrapolates, as the first center line LM1, a line which connects points positioned "0.5° We (=We/2)" away from the right white line RL in the "−" direction of the y-axis. Further, the driving support ECU 10 extrapolates, as the second center line LM2, a line which connects points positioned "0.5° We (=We/2)" away from the right white line RL in the "+" direction of the y-axis. In some embodiments, the road width We may be a predetermined value which is stored in the ROM in advance, or a value acquired based on road information of a navigation system (not shown) and the current position of the own vehicle.

The driving support ECU 10 calculates, every time the certain period of time elapses, the position and the direction of the own vehicle 100 in the travel lane (original lane) defined by the left white line and the right white line. For example, when the own vehicle 100 is currently traveling in the travel lane 201, the driving support ECU 10 calculates, every time the certain period of time elapses, a distance dL in the road-width direction between a reference point (that is, the center position in the vehicle-width direction of the own vehicle 100) of the own vehicle 100 and the first center line LM1. The distance dL is a distance indicative of an amount of difference by which the own vehicle 100 is shifted/deviated in the road-width direction with respect to the first center line LM1. Hereinafter, the distance dL is also referred to as a "lateral difference dL".

The driving support ECU 10 calculates a curvature CL of the curve of the first center line LM1 of the travel lane 201. Further, the driving support ECU 10 calculates an angle of deviation θL (hereinafter, referred to as "yaw angle θL") formed between the direction (direction of tangent) of the first center line LM1 and the traveling direction of the own vehicle 100.

The curvature CL, the lateral difference dL, the yaw angle θL, and the information on the white lines are collectively referred to as "lane information". As described above, in the present embodiment, the driving support ECU 10 calculates the curvature CL, the lateral difference dL and the yaw angle L. In place of this configuration, the camera sensor 16*b* may calculate the curvature CL, the lateral difference dL, and the yaw angle θL, and transmit/output the calculation results (that is, the lane information) to the driving support ECU 10. As understood from the above, the driving support ECU 10 has, as a functional unit implemented by the CPU, a "lane information acquiring unit (lane information acquiring unit, lane line recognition unit) 10*a* for recognizing the lane lines (white lines) to acquire the lane information".

<Adaptive Cruise Control (ACC)>

When a preceding vehicle (referred to as an "ACC-target vehicle") traveling immediately ahead of the own vehicle is present, the following-travel inter-vehicle-distance control has the own vehicle follow the preceding vehicle while maintaining an inter-vehicle distance between the preceding vehicle and the own vehicle at a predetermined distance, based on the target object information. In the following, the following-travel inter-vehicle-distance control is referred to as "Adaptive Cruise Control (ACC)". The ACC itself is widely known (e.g., refer to Japanese Patent Application Laid-open No. 2014-148293, Japanese Patent Application Laid-open No. 2006-315491, Japanese Patent No. 4172434, and Japanese Patent No. 4929777). Thus, a brief description on the ACC is now given.

The driving support ECU 10 is configured to perform the ACC when the ACC is requested through the operation applied to the operation switch 17.

Specifically, the driving support ECU 10 selects the ACC-target vehicle, which the own vehicle should follow, based on the target object information acquired by the ambient sensor 16 when the execution of the ACC is requested. For example, the driving support ECU 10 determines whether or not a relative position of the target object (n) is present within a following-target vehicle area. The relative position of the target object (n) is determined based on the lateral distance Dfy(n) and the inter-vehicle distance Dfx(n) of the detected target object (n). The following-target vehicle area is an area previously determined such that, the longer the distance in the traveling direction of the own vehicle extrapolated based on the vehicle speed of the own vehicle and the yaw rate of the own vehicle becomes, the smaller the absolute value of the distance in the lateral direction with respect to the traveling direction becomes. Then, when the relative position of the target object (n) is present within the following-target vehicle area for a time equal to or longer than a predetermined time, the driving support ECU 10 selects the target object (n) as the ACC-target vehicle. If a plurality of target objects (n) are present whose relative positions are present within the following-target vehicle area for the time equal to or longer than the predetermined time, the driving support ECU 10 selects as the ACC-target vehicle the target object having the minimum inter-vehicle distance Dfx(n) from among those target objects.

Further, the driving support ECU 10 calculates a target acceleration Gtgt in accordance with any of the following Expressions (1) and (2). In the Expressions (1) and (2), Vfx(a) is a relative vehicle speed of the ACC-target vehicle (a) with respect to the own vehicle, k1 and k2 are predetermined positive gains or coefficients, and ΔD1 is an inter-vehicle distance difference obtained by subtracting a target inter-vehicle distance Dtgt from the inter-vehicle distance Dfx(a) of the ACC-target vehicle (a) (ΔD1=Dfx(a)−Dtgt). The target inter-vehicle distance Dtgt is calculated by multiplying a target inter-vehicle time Ttgt by the vehicle speed SPD of the own vehicle 100 (Dtgt=Ttgt×SPD). The target inter-vehicle time Ttgt is set by the driver using the operation switch 17.

The driving support ECU 10 determines the target acceleration Gtgt in accordance with the following Expression (1) when the value (k1×ΔD1+k2×Vfx(a)) is positive or zero. In the Expression (1), ka1 is a positive gain or coefficient for accelerating the own vehicle and is set to a value equal to or smaller than "1".

$$Gtgt\text{(for acceleration)}=ka1\times(k1\times\Delta D1+k2\times Vfx(a)) \quad (1)$$

On the other hand, when the value (k1×ΔD1+k2×Vfx(a)) is negative, the driving support ECU 10 determines the target acceleration Gtgt in accordance with the following Expression (2). In the Expression (2), kd1 is a gain or coefficient for decelerating the own vehicle and in this embodiment, is set to "1".

$$Gtgt\text{(for deceleration)}=kd1\times(k1\times\Delta D1+k2\times Vfx(a)) \quad (2)$$

When no target object is present within the following-target vehicle area, the driving support ECU 10 determines the target acceleration Gtgt based on the vehicle speed SPD of the own vehicle and a target vehicle speed in such a manner that the vehicle speed SPD of the own vehicle matches up with (becomes equal to) the target vehicle speed which is set depending on the target inter-vehicle time Ttgt.

The driving support ECU 10 controls the engine actuators 21 by using the engine ECU 20, and if necessary, controls the brake actuator 31 by using the brake ECU 30 in such a manner that the acceleration of the own vehicle matches up with (becomes equal to) the target acceleration Gtgt. As described above, the driving support ECU 10 has, as a functional unit implemented by the CPU, an "ACC control unit 10b for performing the following-travel inter-vehicle-distance control such as the ACC".

<Lane Keeping Assist Control>

The driving support ECU 10 is configured to perform the lane keeping assist control when the lane keeping assist control is requested through the operation applied to the operation switch 17 under the execution of the following-travel inter-vehicle-distance control (ACC).

In the lane keeping assist control, the driving support ECU 10 determines/sets/produces a target traveling line (target traveling path) by using one or both of the white lines and a trajectory/locus of the preceding vehicle. The target traveling line is set within the lane in which the own vehicle is currently traveling. Hereinafter, the trajectory/locus of the preceding vehicle is referred to as a "preceding vehicle trajectory". The driving support ECU 10 applies the steering torque to the steering system to change the steering angle of the own vehicle in such a manner that a lateral position of the own vehicle (i.e., a position in the vehicle-width direction of the own vehicle with respect to the lane) is maintained in an immediate vicinity of (at a position close to) the target traveling line. In this manner, the steering operation of the driver can be assisted/supported. The lane keeping assist control is widely known (e.g., refer to Japanese Patent Application Laid-open No. 2008-195402, Japanese Patent Application Laid-open No. 2009-190464, Japanese Patent Application Laid-open No. 2010-6279, and Japanese Patent No. 4349210). The lane keeping assist control is also referred to as "Lane Trace Control (LTC)" or "Traffic Jam Assist (TJA)". Hereinafter, the lane keeping assist control is sometimes simply referred to as "LTC".

The LTC will be described in more detail. The LTC is performed by using the target traveling line determined based on the white lines. The driving support ECU 10 acquires target lane information necessary for the execution of the LTC based on the above-mentioned lane information.

Figure 3:
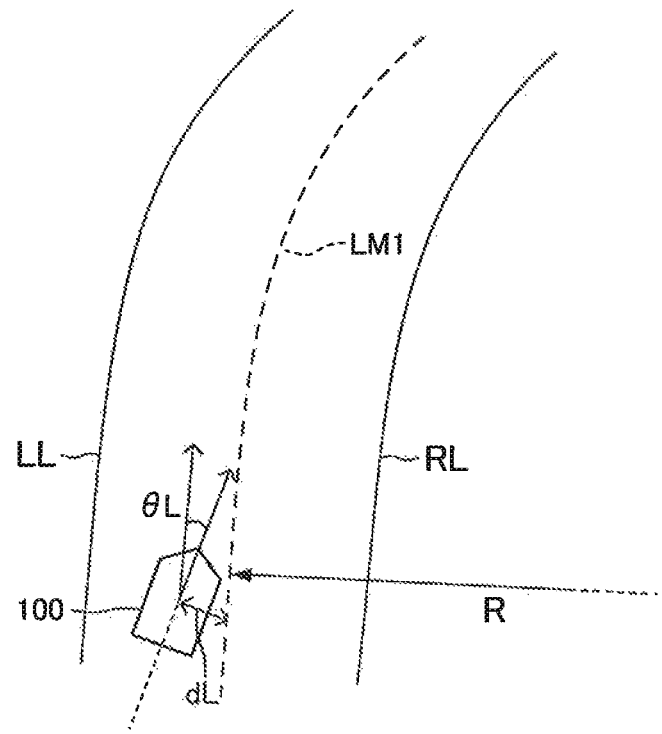
FIG. 3 is a plan view for illustrating a situation in which the lane keeping assist control is performed by using a target traveling line determined based on a center line of a travel lane.

More specifically, as illustrated in FIG. 3, when setting the first center line LM1 as the target traveling line, the driving support ECU 10 acquires, from the lane information, target lane information necessary for the execution of the LTC, The target lane information includes the curvature CL of the target traveling line, the yaw angle θL of the own vehicle with respect to the target traveling line, and the lateral difference dL of the own vehicle with respect to the target traveling line.

The driving support ECU 10 calculates, every time the certain period of time elapses, a target steering angle θ* by applying the curvature CL, the yaw angle θL, and the lateral difference dL to the following Expression (3). Further, the driving support ECU 10 controls the steering motor 42 by using the steering ECU 40 in such a manner that an actual steering angle θ of the own vehicle matches up with (becomes equal to) the target steering angle θ*. In the Expression (3), Klta1, Klta2 and Klta3 are predetermined control gains or coefficients.

$$\theta^* = Klta1 \times CL + Klta2 \times \theta L + Klra3 \times dL \quad (3)$$

The driving support ECU 10 may calculate a target yaw rate YRc* in accordance with the following Expression (3'). The target yaw rate YRc* is a yaw rate necessary for having the own vehicle 100 travel along the target traveling line. The driving support ECU 10 may calculate a target steering torque Tr* for realizing/generating the target yaw rate YRc* by using a lookup table, the target yaw rate YRc*, and an actual yaw rate YRt of the own vehicle. In this configuration, the driving support ECU 10 controls the steering motor 42 by using the steering ECU 40 in such a manner that the actual steering torque Tra of the own vehicle matches up with (becomes equal to) the target steering torque Tr*. In the Expression (3'), K1, K2 and K3 are predetermined control gains or coefficients.

$$YRc^* = K1 \times dL + K2 \times \theta L + K3 \times CL \quad (3')$$

Next, an aspect of the LTC will be described which is performed by using the target traveling line determined based on the preceding vehicle trajectory. Such an aspect is also referred to as a "follow-up steering control". The preceding vehicle of which preceding vehicle trajectory is used to determine the target traveling line may be referred to as a "follow-up preceding vehicle for steering control". The driving support ECU 10 specifies/determines the preceding vehicle (that is, the follow-up preceding vehicle for steering control) 110, which is the target object for determining/obtaining the preceding vehicle trajectory L1 which is used to determine the target traveling line, in the same manner as when specifying the ACC-target vehicle.

Figure 4:
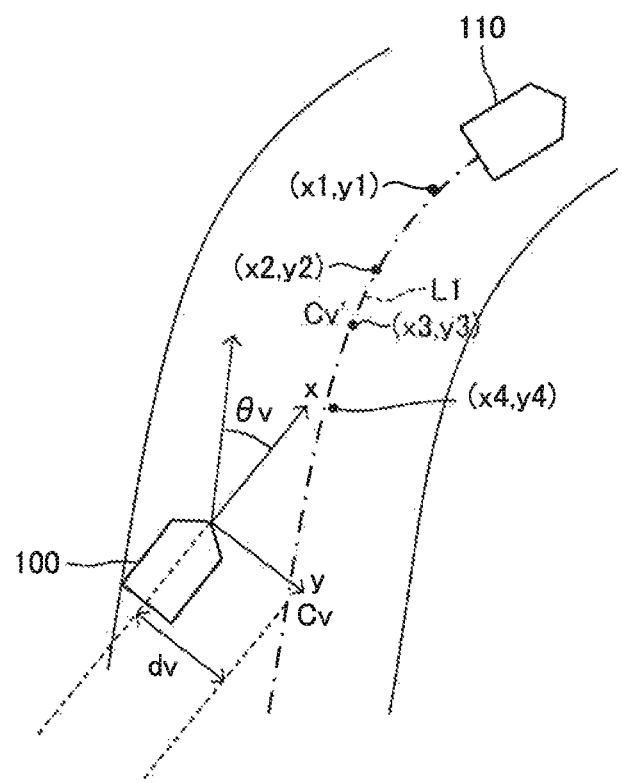
FIG. 4 is a plan view for illustrating a situation in which the lane keeping assist control is performed by using a target traveling line determined based on a preceding vehicle trajectory.

As illustrated in FIG. 4, the driving support ECU 10 specifies/determines the preceding vehicle 110 which is the target object for determining/obtaining the preceding vehicle trajectory L1. The driving support ECU 10 determines/obtains the preceding vehicle trajectory L1 based on the target object information. The target object information includes information on positions of the preceding vehicle 110 with respect to the position of the own vehicle 100 at predetermined time intervals.

The symbols shown in FIG. 4 are as follows.

dv: a distance in the y-axis direction (substantially in the road-width direction) between the current position (x=0, y=0) of the center position of the own vehicle 100 in the vehicle-width direction and the preceding vehicle trajectory L1.

θv: an angle of deviation (yaw angle) between the direction (tangential direction) of the preceding vehicle trajectory L1 at a position corresponding to the current position (x=0, y=0) of the own vehicle 100, and the traveling direction ("+" direction of the x-axis) of the own vehicle 100.

Cv: a curvature of the preceding vehicle trajectory L1 at a position (x=0, y=dv) corresponding to the current position (x=0, y=0) of the own vehicle 100.

Cv': a change ratio of the curvature, that is, a curvature change amount per unit distance (Δx) at an any position (x=x0, x0 is an arbitrary value) of the preceding vehicle trajectory L1.

For example, the driving support ECU 10 stores (buffers) position coordinate data (position information) on the position of the preceding vehicle 110 in the RAM every time the certain sampling period of time elapses. In order to minimize data to be stored in the RAM, the driving support ECU 10 may store only a limited number of "relatively new position coordinate data sets of the preceding vehicle 110" which have been obtained within a certain period up to the current time point and which includes the latest position coordinate data set, and discard the position coordinate data sets older than the data sets obtained in that certain period. The driving support ECU 10 converts the position coordinate data of the preceding vehicle 110 stored in the RAM into the position coordinate data of the above-described x-y coordinate system where the current position of the own vehicle 100 is the origin (x=0, y=0). The driving support ECU 10 executes the above-mentioned converting process based on differences between (i) the position and traveling direction of the own vehicle 100 at each time point at which the position coordinate data is acquired, and (ii) the position and traveling direction of the own vehicle 100 at the current time point. In FIG. 4, (x1, y1), (x2, y2), (x3, y3) and (x4, y4) are examples of the position coordinate data of the preceding vehicle 110 which are obtained by converting in the above-mentioned manner. Hereinafter, such position coordinate data are also referred to as "converted position coordinate data".

The driving support ECU 10 executes a curve fitting process by using the converted position coordinate data of the preceding vehicle 110 to determine/extrapolate/obtain the preceding vehicle trajectory L1 of the preceding vehicle 110. For example, a cubic function f(x) is used in the fitting curve process. In the fitting process, for example, the least squares method is used. As described above, the driving support ECU 10 has, as a functional unit implemented by the CPU, a "preceding vehicle trajectory determining/obtaining unit 10c for determining/extrapolating the preceding vehicle trajectory L1 of the preceding vehicle".

Figure 5:
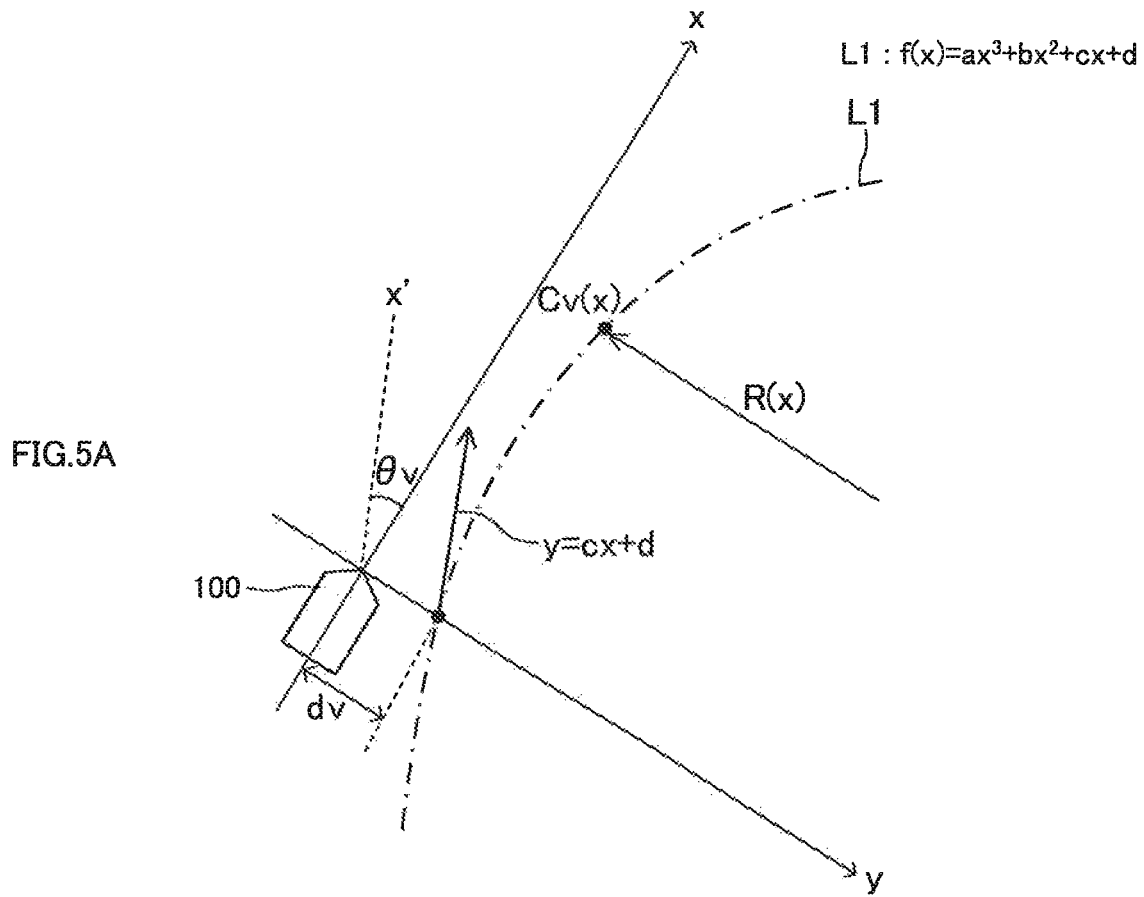

As illustrated in FIG. 5A, the preceding vehicle trajectory L1 is defined by the following cubic function: $f(x)=ax^3+bx^2+cx+d$. Using expressions and conditions shown in FIG. 5B, the relationship shown in FIG. 5C, that is, the relationship between the coefficients (a, b, c and d) of the cubic function f(x), the curvature Cv, the yaw angle θv and the like is derived. Therefore, the preceding vehicle trajectory L1 can be expressed by the following Expression (4). As understood from the above, the driving support ECU 10 can determine/define the preceding vehicle trajectory L1 by obtaining/fixing the coefficients a, b, c and d of the cubic function f(x) through the least squares method. Therefore, the change ratio of the curvature Cv' of the preceding vehicle trajectory L1, the curvature Cv of the preceding vehicle trajectory L1 at the position corresponding to the current position of the own vehicle 100, the yaw angle θv at that position, and the distance dv at that position can be obtained.

$$f(x)=(1/6)Cv'xx^3+(1/2)Cvxx^2+\theta v xx+dv \quad (4)$$

When setting the preceding vehicle trajectory L1 as the target traveling line, the driving support ECU 10 acquires the target lane information necessary for the execution of the LTC, based on the coefficients a, b, c, and d of the cubic function f(x), and the relationship shown in FIG. 5C. The target lane information includes the curvature Cv (and the change ratio of the curvature Cv') of the target traveling line, the yaw angle θv of the own vehicle with respect to the target traveling line, and the distance dv in the road-width direction with respect to the target traveling line.

In the Expression (3), the driving support ECU 10 replaces dL, θL, and CL with dv, θv, and Cv, respectively, to thereby calculate the target steering angle θ*. The driving support ECU 10 controls the steering motor 42 by using the steering ECU 40 in such a manner that an actual steering angle θ of the own vehicle matches up with (becomes equal to) the target steering angle θ*. Alternatively, the driving support ECU 10 may control the steering motor 42 by using the Expression (3').

Figure 6:
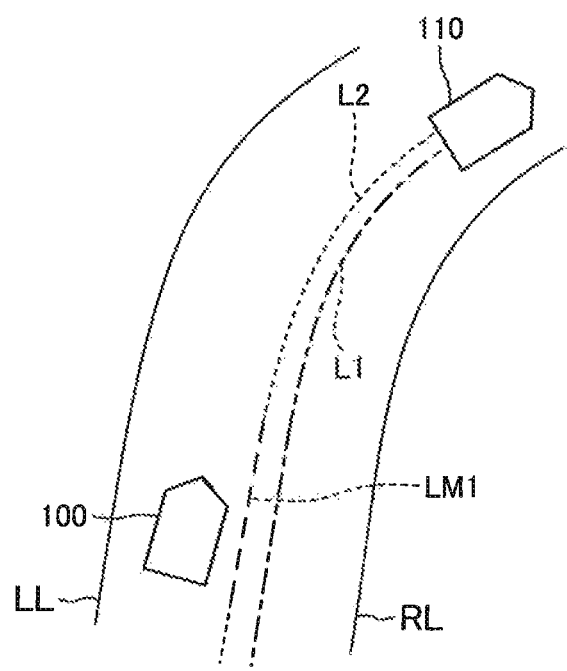
FIG. 6 is a diagram for illustrating a process for correcting/modifying the preceding vehicle trajectory based on the center line of the travel lane.

Further, the driving support ECU 10 may determine/ extrapolate/obtain the target traveling line based on the combination of the preceding vehicle trajectory L1 and the first center line LM1 of the travel lane. Specifically, as illustrated in FIG. 6, the driving support ECU 10 corrects/modifies the preceding vehicle trajectory L1 in such a manner that the preceding vehicle trajectory L1 becomes a trajectory which has the shape (curvature) of the preceding vehicle trajectory L1, and which matches up with the position and direction (tangential direction) of the first center line LM1 in the vicinity of the own vehicle 100. This allows the driving support ECU 10 to obtain, as the target traveling line, the preceding vehicle trajectory L2 which has the same shape (curvature) as the preceding vehicle trajectory L1 and has a small offset/deviation in the road-width direction with respect to the first center line LM1. Hereinafter, the preceding vehicle trajectory L2 which is obtained by correcting the preceding vehicle trajectory L1 in the above-mentioned manner is referred to as a "corrected preceding vehicle trajectory L2". When setting the corrected preceding vehicle trajectory L2 as the target traveling line, the driving support ECU 10 acquires the target lane information with respect to the corrected preceding vehicle trajectory L2. The driving support ECU 10 calculates the target steering angle θ* based on that acquired target lane information and the Expression (3). The driving support ECU 10 controls the steering motor 42 by using the steering ECU 40 in such a manner that an actual steering angle θ of the own vehicle matches up with (becomes equal to) the target steering angle θ*.

The driving support ECU 10 sets the target traveling line depending on the presence/absence of the preceding vehicle and the recognition state of the white lines, and performs the LTC, in accordance with the following situations (a) to (d).

(a) When the driving support ECU 10 has successfully recognized both the left and right white lines up to a far-away position (to a position a first predetermined distance away from the current position of the own vehicle), the driving support ECU 10 sets the target traveling line based on the first center line LM1 of the travel lane to thereby perform the LTC.

(b) When the follow-up preceding vehicle for steering control is present ahead of the own vehicle and the driving support ECU cannot recognize any of the left and right white lines, the driving support ECU 10 sets the target traveling line based on the preceding vehicle trajectory L1 of the follow-up preceding vehicle for steering control to thereby perform the LTC.

(c) When the follow-up preceding vehicle for steering control is present ahead of the own vehicle and the driving support ECU has recognized the left and right white lines in the vicinity of the own vehicle (up to a position a second predetermined distance away from the current position of the own vehicle, the second predetermined distance being shorter than the first predetermined distance), the driving support ECU 10 sets the target traveling line based on the corrected preceding vehicle trajectory L2 obtained by correcting the preceding vehicle trajectory L1 with the first center line LM1 to thereby perform the LTC.

(d) When no follow-up preceding vehicle for steering control is present ahead of the own vehicle and the driving support ECU cannot recognize any of the left and right white lines up to a far-away position, the driving support ECU 10 cancels the LTC.

As described above, the driving support ECU 10 has, as a functional unit implemented by the CPU, a "LTC control unit (lane keeping assist control unit) 10d for performing the lane keeping assist control for changing the steering angle of the own vehicle in such a manner that the own vehicle travels along the target traveling line".

<Lane Change Assist Control>

The lane change assist control provides/generates the steering torque to the steering mechanism to change the steering angle of the own vehicle 100 in such a manner that the own vehicle 100 moves from the travel lane (original lane) in which the own vehicle is currently traveling to the adjacent lane (target lane) to which the driver desires to change lanes from the travel lane. Thus, the driver's steering operation for changing lanes is assisted. Hereinafter, the lane change assist control is simply referred to as "LCA".

Similarly to the LTC, the LCA is control for adjusting a lateral position (position in the road-width direction) of the own vehicle 100 with respect to the lane. The LCA is performed in place of the LTC when the lane change assist request is accepted while the ACC and the LTC are being performed.

The driver operates the turn signal lever 44 to start intermittently flashing the turn signal 51. When the driving support ECU 10 receives the lane change assist request, the driving support ECU 10 sounds the buzzer 61 for a short time to notify the driver that the lane change assist request is accepted. When the lane change assist request is accepted, the driving support ECU 10 continues intermittently flashing the turn signal 51.

Calculation of Target Trajectory

When performing the LCA, the driving support ECU 10 calculates a target trajectory for having the own vehicle 100 change lanes, based on the "lane information at the current time point" supplied from the camera sensor 16b. The target trajectory is a trajectory along which the own vehicle 100 is to be moved, for a "target lane change time period", from the lane (the travel lane 201 in FIG. 2) in which the own vehicle is currently traveling to the center position in the lane-width direction of the target lane (the adjacent lane 202 in FIG. 2) specified by the lane change assist request. The center position in the lane-width direction of the target lane corresponds to a position on the second center line LM2 (see FIG. 2) of the target lane. The center position in the lane-width direction of the target lane is also referred to as a "final target lateral position". The target trajectory is defined/expressed by a target lateral position y(t) of the own vehicle 100 with respect to an elapsed time "t" from the start of the LCA (as a variable), with reference to (i.e., from) the first center line LM1 (see FIG. 2) of the original lane.

The target lane change time period described above is set to be proportional to a distance (hereinafter, referred to as a "necessary lateral distance") for moving the own vehicle 100 to the final target lateral position in the lateral direction (lane-width direction). When the lane width is 3.5 m as in the case of typical roads, the target lane change time period is set to, for example, 8.0 seconds. When the lane width is, for example, 4.0 m, the target lane change time period is set to 9.1 (=8.0×4.0/3.5) seconds.

In addition, when the lateral position of the own vehicle 100 at the start of the LCA is shifted/deviated toward the target lane with respect to the first center line LM1 of the original lane, the target lane change time period is decreased (is made shorter) as the shift/deviation amount (magnitude of the lateral difference dL) is larger. On the other hand, when the lateral position of the own vehicle 100 at the start of the LCA is shifted/deviated to a side opposite to the target lane with respect to the first center line LM1 of the original lane, the target lane change time period is increased (is made longer) as the shift/deviation amount (magnitude of the lateral difference dL) is larger. The driving support ECU 10 corrects/modifies a reference target lane change time period (for example, 8 seconds) which is a reference (standard time) for the target lane change time period in accordance with the lane width of the original lane, the lane width of the target lane, the shift/deviation amount with respect to the first center line LM1 of the original lane, and the like, to thereby determine the target lane change time period.

The driving support ECU 10 calculates the target lateral position y in accordance with the target lateral position function y(t) expressed by the following Expression (5). The target lateral position function y(t) is a fifth-order function of the elapsed time t serving as a variable.

$$y(t)=a \cdot t^5+b \cdot t^4+c \cdot t^3+d \cdot t^2+e \cdot t+f \qquad (5)$$

In the Expression (5), the constants a, b, c, d, e, and f are determined based on the traveling state of the own vehicle 100 at the calculation of the target trajectory (i.e., (at a time point at which the target trajectory is calculated), the lane information, the target lane change time period, and the like. The driving support ECU 10 calculates the constants a, b, c, d, e, and f through inputting/applying the traveling state of the own vehicle 100, the lane information, and the target lane change time period to a vehicle model stored in the ROM 10x in advance in order to obtain a smooth target trajectory. The target lateral position at the time point "t" is obtained through substituting the calculated constants a, b, c, d, e, and f, and the elapsed time "t" from the start of the LCA into the Expression (5). In addition, the constant f in the Expression (5) corresponds to the lateral position of the own vehicle 100 at t=0 (that is, at the start of the LCA), and is thus set to the same value as the lateral difference dL.

In addition, the method for calculating the target lateral position y is not limited to the above-described method. The target lateral position y may be set by any one of other well-known methods. For example, the target lateral position y need not be calculated using a fifth-order function such as the above-mentioned Expression (5), but may be obtained/calculated using an arbitrary and appropriate function.

Control of Steering Angle

The driving support ECU 10 performs the LTC until the LTA is started. In the LTC, the target steering angle θ* is calculated as described above, and the steering motor 42 is controlled in such a manner that an actual steering angle θ of the own vehicle 100 matches up with (becomes equal to) the target steering angle θ*. In the LCA, the driving support ECU 10 controls the steering motor 42 in the same manner as the LTC.

In other words, the driving support ECU 10 replaces the target traveling line used in the LTC with the line expressed by the target lateral position function y(t) in accordance with the above Expression (5) to thereby perform the LCA. For example, the driving support ECU 10 calculates a target steering angle θlcs* in accordance with the following Expression (6). The driving support ECU 10 drives/controls the steering motor 42 in such a manner that an actual steering angle θ of the own vehicle matches up with (becomes equal to) the target steering angle θlcs*.

$$\theta lcs^*=Klcs1 \cdot CL^*Klcs2 \cdot (\theta L^*-\theta L)+Klcs3 \cdot (dL^*-dL) \qquad (6)$$

In the Expression (6), "θL" and "dL" are values obtained from the lane information (CL, dL, and θL) at the current time point t (at the time of calculation of θlcs*). Klcs1, Klcs2, and Klcs3 are control gains. "CL*" is the curvature of the target trajectory at the current time point t (at the time of calculation of θlcs*). In addition, "θL*" is a yaw angle of the target trajectory with respect to the first center line LM1 at the current time point t (at the time of calculation of θlcs*). "dL*" is a lateral difference of the target trajectory (dL*=y(t)) at the current time point t (at the time of calculation of θlcs*).

As described above, the driving support ECU 10 has, as a functional unit implemented by the CPU, an "LCA control unit (lane change assist control unit) 10e for performing the lane change assist control for changing the steering angle of the own vehicle in such a manner that the own vehicle changes lanes along the target trajectory".

<Summary of Operation>

As described above, in performing the LCA, the related-art apparatus 2 may not perform an appropriate processing in a situation in which the reliability of the white line recognition result is low. In order to solve this problem, for example, even in the case of performing the LCA, it is conceivable to determine whether to impose a strict limitation on the steering control amount in accordance with the same criterion as in the case of the LTC (the criterion relating to the reliability of the white line recognition result). However, the situation in which the reliability of the white line recognition result is low includes various situations such as the following situations: (i) a situation in which only one of the left and right white lines can be recognized, (ii) a situation in which the white lines are misrecognized, and the like. When the LCA is performed, it is not appropriate to impose the strict limitation on the steering control amount in all the above-mentioned situations, from the viewpoint of safely moving the own vehicle from the original lane to the target lane. Therefore, even in the situation in which the reliability of the white line recognition result is low, it is preferable to perform the LCA without imposing the strict limitation on the steering control amount, depending on the situation.

In view of the above, the embodiment apparatus classifies the reliability of the white line recognition result into three levels (hereinafter referred to as a "white line recognition level" or "white line recognition rank") described later in advance, and determines the white line recognition level. Hereinafter, the reliability of the white line recognition result is also referred to as "white line recognition accuracy". When performing the LTC, in a case where the white line recognition level is equal to or lower than a predetermined level among the three levels, the embodiment apparatus lowers the responsiveness of the LTC. On the other hand, when performing the LCA, the embodiment apparatus does not lower the responsiveness of the LCA in a case where the white line recognition level is equal to (or higher than) the predetermined level, but the embodiment apparatus lowers the responsiveness of the LCA in a case where the white line recognition level is lower than the predetermined level.

Specifically, the embodiment apparatus firstly determines/evaluates which of the following levels (white line recognition level) the white line recognition accuracy corresponds to.

(Level 1): The embodiment apparatus has misrecognized (erroneously recognized) one or both of the left and right white lines of the original lane (lane in which the own vehicle is currently traveling).

(Level 2): The embodiment apparatus has correctly recognized only one of the left and right white lines of the original lane (i.e., either the left white line or the right white line of the original lane).

(Level 3): The embodiment apparatus has correctly recognized both of the left and right white lines of the original lane.

In the present embodiment, the situation in which the reliability of the white line recognition result is relatively low is classified into the above two levels (Level 1 and Level 2). "Level 1" is a white line recognition level when the white line recognition accuracy is the lowest. In Level 1, the expression "misrecognized" means a situation in which there is a high possibility that a fixed (stationary) object different from the white line (e.g., a curb (edge stone) extending along the white line) is recognized as the white line. When the white line recognition level is the Level 1, the accuracy of the center line extrapolated based on the recognized (i.e., misrecognized) white lines also is the lowest. As will be described later, the embodiment apparatus can determine that the white line recognition accuracy corresponds to the Level 1 only when both of the left and right white lines of the original lane have been recognized at least in the vicinity of the own vehicle and the preceding vehicle is present ahead of the own vehicle.

The white line recognition accuracy when the white line recognition level corresponds to the "Level 2" is higher than the white line recognition accuracy when the white line recognition level corresponds to the "Level 1", but is lower than the white line recognition accuracy when the white line recognition level corresponds to the "Level 3", This is because the situation in which only one of the left and right white lines has been recognized may be either of the following situations: (i) a situation in which only one white line has been correctly recognized, and (ii) a situation in which only one white line has been misrecognized. When the white line recognition level is the Level 2, the accuracy of the center line extrapolated based on the recognized white line is also higher than that of when the white line recognition level is the Level 1, but is lower than that of when the white line recognition level is the Level 3.

The white line recognition accuracy when the white line recognition level corresponds to the "Level 3" is the highest. When the white line recognition level is the Level 3, the accuracy of the center line extrapolated based on the recognized white lines is also the highest.

When performing the LTC, the embodiment apparatus limits (imposes a limitation on) the steering control amount (e.g., the target steering angle θ*, the target steering angular velocity and the like) in such a manner that the magnitude of that steering control amount does not exceed an upper limit value (upper limit value for the LTC). The embodiment apparatus performs the steering control (LTC) for changing the steering angle based on the limited steering control amount. The embodiment apparatus changes the upper limit value of the magnitude of the steering control amount in response to the above-described "white line recognition level" indicative of the recognition accuracy of the white lines. That is, when the white line recognition level is the Level 1 or the Level 2, the embodiment apparatus changes/sets the upper limit value of the magnitude of the steering control amount to a value lower than that of when the white line recognition level is the Level 3. Therefore, when the white line recognition level is the Level 1 or the Level 2, the embodiment apparatus performs the steering control (LTC) with a steering control amount having a magnitude which can vary within a relatively small range. On the other hand, when the white line recognition accuracy is the Level 3, the embodiment apparatus performs the steering control (LTC) with a steering control amount having a magnitude which can vary within a relatively large range.

When performing the LCA, the embodiment apparatus limits (imposes a limitation on) the steering control amount (e.g., the target steering angle θlcs*, the target steering angular velocity and the like) in such a manner that the magnitude of that steering control amount does not exceed an upper limit value (upper limit value for the LCA). The embodiment apparatus performs the steering control (LCA) for changing the steering angle based on the limited steering control amount. The embodiment apparatus changes the upper limit value of the magnitude of the steering control amount in response to the above-described "white line recognition level" indicative of the recognition accuracy of the white lines. That is, when the white line recognition level is the Level 1, the embodiment apparatus changes/sets the upper limit value of the magnitude of the steering control amount to a value smaller than that of when the white line recognition level is the Level 2 or the Level 3. Therefore, when the white line recognition level is the Level 1, the embodiment apparatus performs the steering control (LCA) with a steering control amount having a magnitude which can vary within a relatively small range. On the other hand, when the white line recognition accuracy is the Level 2 or the Level 3, the embodiment apparatus performs the steering control (LCA) with a steering control amount having a magnitude which can vary within a relatively large range.

In the above manner, in the embodiment apparatus, the threshold of the recognition accuracy of the white lines for changing the upper limit value of the steering control amount in the LTC is different from the threshold of the recognition accuracy of the white lines for changing the upper limit value of the steering control amount in the LCA. That is, in the case of the LTC, when the white line recognition level is equal to or lower than the Level 2, the upper limit value of the steering control amount for the LTC is set to a low value, whereby the steering control (LTC) is performed with a steering control amount having a magnitude which can vary within a relatively small range. According to this configuration, in a situation (that is, the Level 1) in which one or both of the left and right white lines have been misrecognized or in a situation (that is, the Level 2) in which only one of the left and right white lines has been recognized, the embodiment apparatus can prevent/suppress a sudden movement of the own vehicle in the lane-width direction on the original lane due to misrecognition of the white line(s). On the other hand, in the case of the LCA, only when the white line recognition level is the Level 1, the upper limit value of the steering control amount for the LCA is set to the low value, whereby the steering control (LCA) is performed with a steering control amount having a magnitude which can vary within a relatively small range. In other words, if the reliability of the white line recognition result is a level (i.e., the Level 2) representing that there is a risk of misrecognition, the embodiment apparatus does not lower the responsiveness of LCA. Therefore, the embodiment apparatus has the own vehicle change lanes from the original lane to the target lane for the predetermined target lane change time period (in other words, within a relatively short time period suitable for the LCA). Accordingly, the embodiment apparatus can reduce the possibility that another vehicle traveling at a high speed in the target lane and approaching from behind the own vehicle comes close to the own vehicle.

<Content of Processing>
Process for Determining Recognition Accuracy of White Lines Next, with reference to FIG. 7 and FIG. 8, a process for determining (evaluating) the recognition accuracy of the white lines, which is performed by the driving support ECU 10, will be described. In other words, this process is a process for determining the white line recognition level. In the examples shown in FIGS. 7 and 8, a time at a certain calculation timing is expressed as t=t1, and a time at the next (subsequent) calculation timing is expressed as t=t2.

Figure 7A:
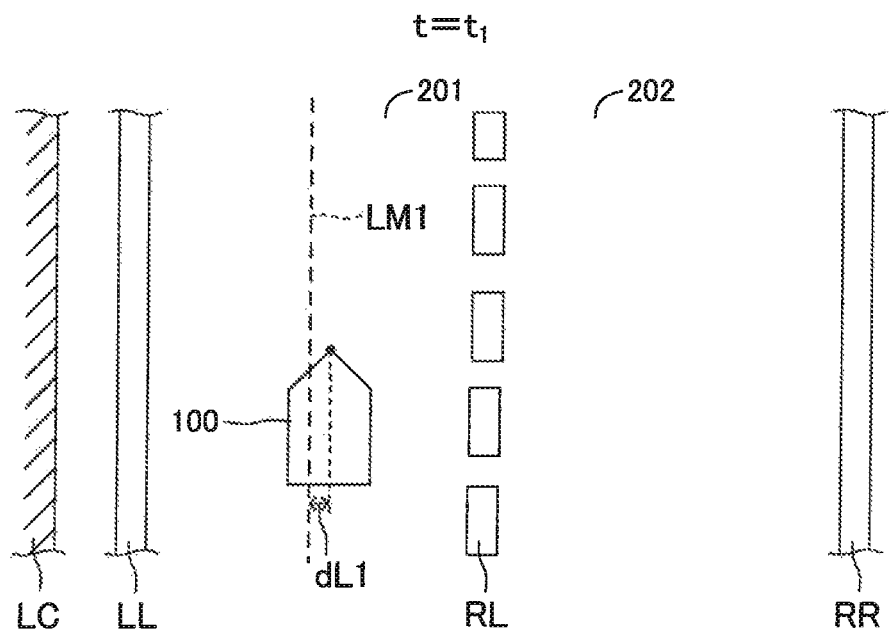
FIG. 7A is a plan view for illustrating a relationship between an extrapolated center line of the travel lane and the position of the vehicle at time point t1.
Figure 7B:
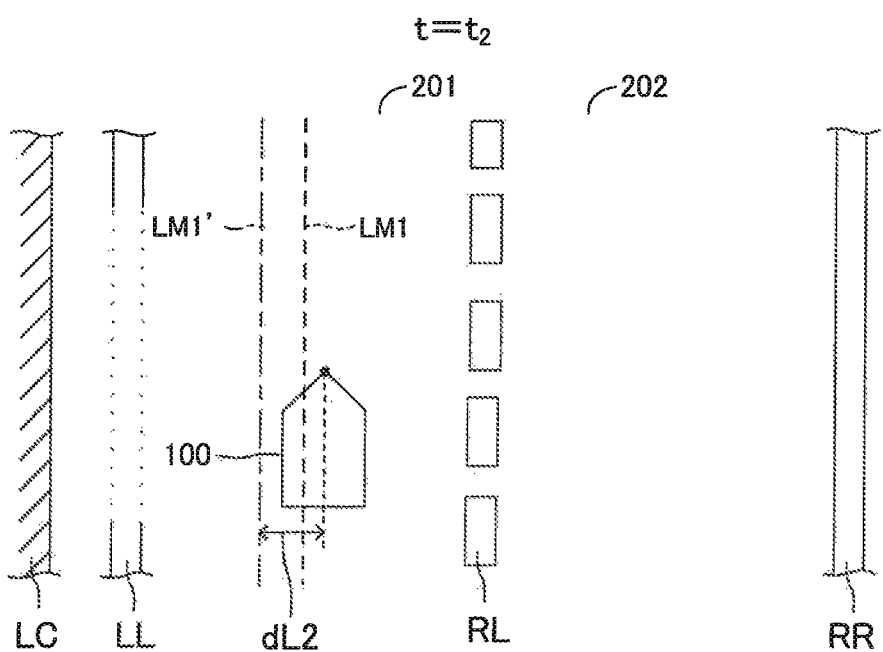
FIG. 7B is a plan view for illustrating a relationship between an extrapolated center line of the travel lane and the position of the vehicle at time point t2.

In the examples shown in FIGS. 7 and 8, the driving support ECU 10 is performing the ACC. That is, processes described below are based on the premise that the preceding vehicle 110 is present ahead of (in front of) the own vehicle 100. The own vehicle 100 travels in the travel lane 201, and the preceding vehicle 110 travels in a front area of the own vehicle 100 in the travel lane 201. In FIGS. 7A and 7B, illustration of the preceding vehicle 110 is omitted. Furthermore, the driving support ECU 10 is performing the LTC in accordance with the target traveling line set/determined based on the first center line LM1.

The driving support ECU 10 recognizes the white lines LL and RL that define the travel lane 201 based on (using) the information transmitted from the camera sensor 16b. When the driving support ECU 10 has recognized only one of the white lines LL and RL, the driving support ECU 10 determines that the white line recognition level is the Level 2. On the other hand, when the driving support ECU 10 has recognized both of the white lines LL and RL that define the travel lane 201, the driving support ECU 10 executes the following processes to determine whether the white line recognition level is the Level 1 or the Level 3.

As illustrated in FIG. 7A, at time t1, the driving support ECU 10 extrapolates the first center line LM1 of the travel lane 201 based on the recognized white lines LL and RL. The driving support ECU 10 calculates a distance dL1 (hereinafter, referred to as a "first center distance") in the lane-width direction between the center position in the vehicle-width direction of the own vehicle 100 and the first center line LM1, and stores the calculated first center distance dL1 in the RAM.

Next, as illustrated in FIG. 7B, it is assumed that, at time t2, the left white line LL of the travel lane 201 is dilute. The driving support ECU 10 has misrecognized, as the left white line, a curb LC provided along the left white line LL. Therefore, at time t2, the driving support ECU 10 extrapolates a first center line LM1' of the travel lane 201 based on the recognized curb LC and white line RL. As a result, at time t2, the position of the first center line of the travel lane 201 is shifted to the position (LM1') on the curb LC side with respect to the correct center line position (LM1).

At time t2, the driving support ECU 10 calculates a first center distance dL2, and stores the calculated first center distance dL2 in the RAM. The driving support ECU 10 calculates a first distance change amount (|dL2−dL1|) which is a magnitude of the amount of change in the first center distance between the previous calculation timing (time t1) and the current calculation timing (time t2). In other words, the first distance change amount (|dL2−dL1|) is a magnitude (absolute value) of the amount of change in the first center distance in a first predetermined time period (t2−t1). The driving support ECU 10 determines whether or not the first distance change amount (|dL2−dL1|) is equal to or larger than a first predetermined threshold Th1.

When the first distance change amount (|dL2−dL1|) is smaller than the first predetermined threshold Th1, the driving support ECU 10 determines that the reliability of the first center line LM1 of the travel lane 201 is high. Therefore, in this situation, the driving support ECU 10 determines that the white line recognition level is the Level 3.

On the other hand, in the example of FIG. 7B, the curb LC has been misrecognized as the left white line. Therefore, the first distance change amount (|dL2−dL1|) is larger than the first predetermined threshold Th1. When the first distance change amount is large, there is a high possibility that misrecognition of the white line has occurred. However, as described below, even in the case where the first distance change amount is large, there may be a case where the misrecognition of the white line has not occurred. For example, in a case where the own vehicle 100 travels at a position apart from the first center line LM1 of the travel lane 201 at the time point at which the LTC is started, the own vehicle 100 moves toward the first center line LM 1 from the start timing of the LTC. In this case, although the first distance change amount is large owing to the start of the LTC, no misrecognition of the white line(s) occurs. As understood from the above, even when the first distance change amount is large, there is a certain possibility that misrecognition of the white line(s) has not occurred. Therefore, the driving support ECU 10 executes the following processes in addition to the process for determining the reliability of the white line recognition result by using the first distance change amount.

Figure 8A:
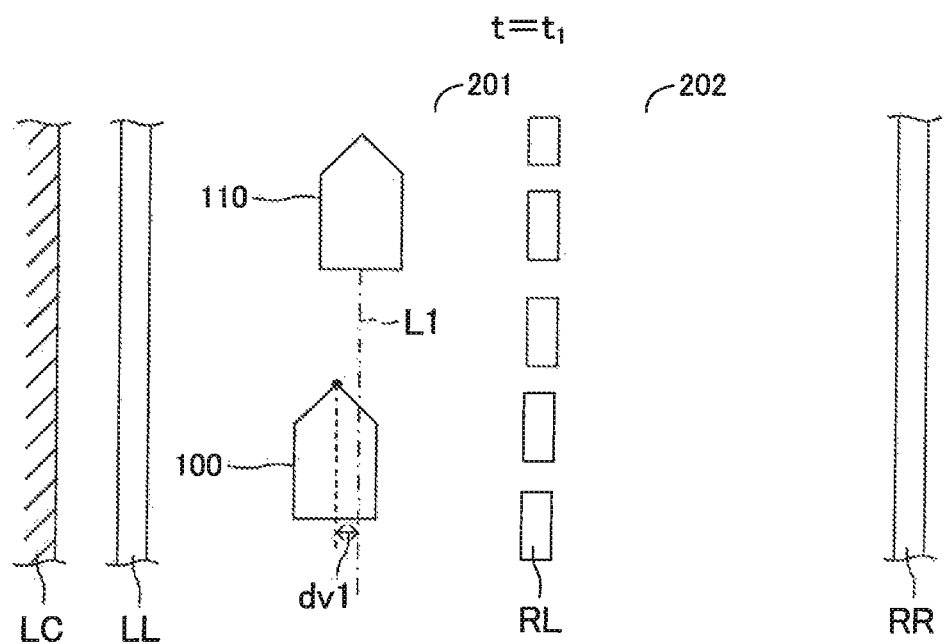
FIG. 8A is a plan view for illustrating a distance between the own vehicle and the preceding vehicle trajectory at time point t1.

As illustrated in FIG. 8A, at time t1, the driving support ECU 10 calculates a distance dv1 (hereinafter, referred to as a "second center distance") in the lane-width direction between the center position in the vehicle-width direction of the own vehicle 100 and the preceding vehicle trajectory L1. The driving support ECU 10 stores the calculated second center distance dv1 in the RAM.

Figure 8B:
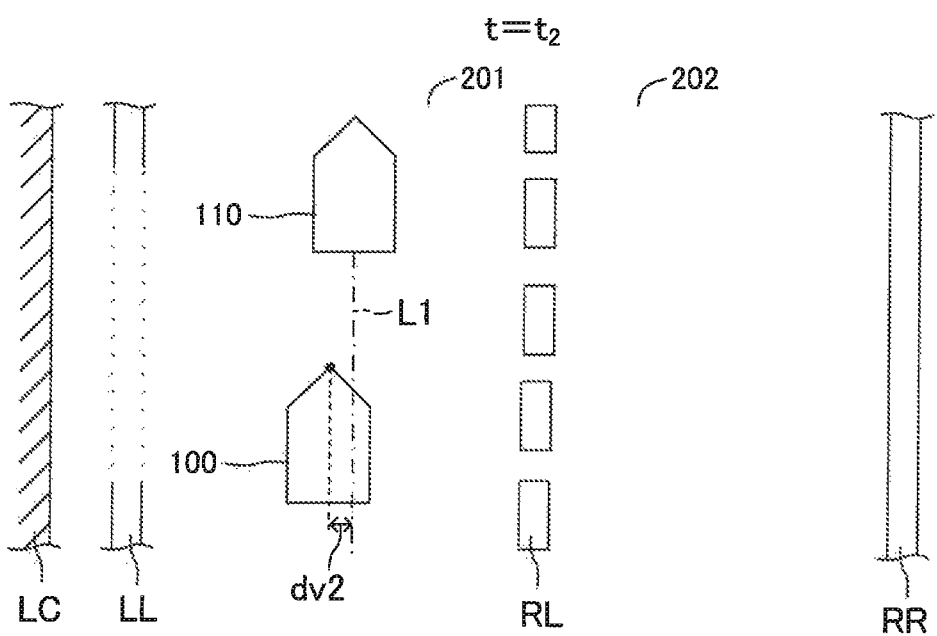
FIG. 8B is a plan view for illustrating a distance between the own vehicle and the preceding vehicle trajectory at time point t2.

As illustrated in FIG. 8B, at time t2, the driving support ECU 10 calculates a second center distance dv2, and stores the calculated second center distance dv2 in the RAM. The driving support ECU 10 calculates a second distance change amount (|dv2−dv1|) which is a magnitude of the amount of change in the second center distance between the previous calculation timing (time t1) and the current calculation timing (time t2). In other words, the second distance change amount is a magnitude (absolute value) of the amount of change in the second center distance in the first predetermined time period (t2−t1). The driving support ECU 10 determines whether or not the second distance change amount (|dv2−dv1|) is equal to or smaller than a second predetermined threshold Th2.

The position of the own vehicle 100 with respect to the preceding vehicle trajectory L1 of the preceding vehicle 110 has not changed between time t1 and time t2. Therefore, the second distance change amount is equal to or smaller than the second predetermined threshold Th2. The case just described above where the first distance change amount is large and the second distance change amount is small means the case has occurred where the distance between the own vehicle 100 and the first center line LM1 of the travel lane 201 has suddenly changed, even though the amount of change in the distance between the own vehicle 100 and the preceding vehicle trajectory L1 is small. Therefore, in this case, there is a high possibility that misrecognition of the white line(s) has occurred. When the first distance change amount (|dL2−dL1|) is equal to or larger than the predetermined first threshold value Th1 and the second distance change amount (|dv2−dv1|) is equal to or smaller than the predetermined second threshold value Th2, the driving support ECU 10 determines that the reliability of the first center line LM1 of the travel lane 201 is low. Therefore, in this case, the driving support ECU 10 determines that the white line recognition level is the Level 1.

On the other hand, when the first distance change amount (|dL2−dL1|) is equal to or larger than the predetermined first threshold value Th1 and the second distance change amount (|dv2−dv1|) is larger than the predetermined second threshold value Th2, the driving support ECU 10 determines that the reliability of the first center line LM1 of the travel lane 201 is high. Therefore, in this case, the driving support ECU 10 determines that the white line recognition level is the Level 3.

As described above, the driving support ECU 10 has, as a functional unit implemented by the CPU, a "reliability determination unit (reliability evaluation unit) 10f for determining (evaluating) the reliability of the recognition result of the pair of white lines which define the travel lane (original lane)".

Guard of Steering Control Amount in LTC

In performing the LTC, when the white line recognition level is the Level 1 or the Level 2, the driving support ECU 10 sets/changes the upper limit value of the magnitude of the steering control amount (that is, the upper limit value of the steering control amount for the LTC) to a value smaller than a value which is set as the upper limit value of the steering control amount for the LTC when the white line recognition level is the Level 3. The driving support ECU 10 limits the steering control amount in such a manner that the magnitude of that steering control amount does not exceed the upper limit value. The driving support ECU 10 performs the steering control (LTC) for changing the steering angle based on (using) the limited steering control amount.

The steering control amount is a parameter to determine/define the steering angle of the own vehicle, and includes at least one of the target steering angle θ* or the target steering angular velocity.

In performing the LTC, the driving support ECU 10 adopts the target steering angle θ* and the target steering angular velocity as the steering control amounts. When the white line recognition level is the Level 3, the driving support ECU 10 limits the target steering angle θ* in such a manner that the magnitude of the target steering angle θ* does not exceed a first steering angle upper limit value $\theta 1_{max}$. That is, when the magnitude of the target steering angle θ* exceeds the first steering angle upper limit value $\theta 1_{max}$, the driving support ECU 10 sets the magnitude of the target steering angle θ* to the first steering angle upper limit value $\theta 1_{max}$.

Further, when the white line recognition level is the Level 3, the driving support ECU 10 limits the target steering angular velocity in such a manner that the magnitude of the target steering angular velocity does not exceed a first steering angular velocity upper limit value $d\theta 1_{max}(>0)$. The target steering angle θ* at a time point a predetermined time period before the current time point is denoted by "$\theta_{old}$", and the target steering angle θ* at the current time point is denoted by "$\theta_{now}$". The driving support ECU 10 limits the target steering angle θ* as follows. In addition, when the magnitude of the target steering angle θ* is limited by the first steering angle upper limit value $\theta 1_{max}$ before the following process for limiting (i.e., (1a) or (1 b)) becomes effective, the driving support ECU 10 uses "that value limited by the first steering angle upper limit value $\theta 1_{max}$" as $\theta_{now}$.

(1a) When $(\theta_{now}-\theta_{old})>d\theta 1_{max}$, the driving support ECU 10 sets the target steering angle θ* to "$\theta_{old}+d\theta 1_{max}$".

(1 b) When $(\theta_{old}-\theta_{now})>d\theta 1_{max}$, the driving support ECU 10 sets the target steering angle θ* to "$\theta_{old}-d\theta 1_{max}$".

On the other hand, when the white line recognition level is the Level 1 or the Level 2, the driving support ECU 10 limits the target steering angle θ* in such a manner that the magnitude of the target steering angle θ* does not exceed a second steering angle upper limit value $\theta 2_{max}$. The second steering angle upper limit value $\theta 2_{max}$ is smaller than the first steering angle upper limit value $\theta 1_{max}$. When the magnitude of the target steering angle θ* exceeds the second steering angle upper limit value $\theta2_{max}$, the driving support ECU 10 sets the magnitude of the target steering angle θ* to the second steering angle upper limit value $\theta2_{max}$.

Further, when the white line recognition level is the Level 1 or the Level 2, the driving support ECU 10 limits the target steering angular velocity in such a manner that the magnitude of the target steering angular velocity does not exceed a second steering angular velocity upper limit value $d\theta2_{max}$ (≥0). More specifically, the driving support ECU 10 limits the target steering angle θ* as follows. In addition, when the magnitude of the target steering angle θ* is limited by the second steering angle upper limit value $\theta2_{max}$ before the following process for limiting (i.e., (1c) or (1d)) becomes effective, the driving support ECU 10 uses that limited value as $\theta_{now}$.

(1c) When $(\delta_{now}-\theta_{old})>d\theta2_{max}$, the driving support ECU 10 sets the target steering angle θ* to "$\theta_{old}+\theta2_{max}$".

(1d) When $(\theta_{old}-\theta_{now})>d\theta2_{max}$, the driving support ECU 10 sets the target steering angle θ* to "$\theta_{old}-d\theta2_{max}$".

In this manner, when the white line recognition level is the Level 1 or the Level 2, the driving support ECU 10 lowers the responsiveness of the LTC. As a result, the driving support ECU 10 can prevent the position in the lane-width direction or direction of the own vehicle 100 from suddenly changing due to the misrecognition of the white line(s). It should be noted that the first steering angle upper limit value $\theta1_{max}$ and/or the first steering angular velocity upper limit value $d\theta1_{ma}$, may be set to very large values, respectively (each of the values which exceeds a range that can be taken in the LTC). In this configuration, when the white line recognition level is the Level 3, the magnitude of the target steering angle θ* and/or the magnitude of the target steering angular velocity are substantially/practically not limited.

Further, when the white line recognition level is the Level 1 or the Level 2, the driving support ECU 10 may set each of the magnitudes of the control gains Klta2 and/or Klta3 in the above Expression (3) to a value smaller than that used/set when the white line recognition level is the Level 3. This can also allow the driving support ECU 10 to lower the responsiveness of the LTC when the white line recognition level is the Level 1 or the Level 2. In this configuration, the upper limit value of the steering control amount for the LTC may or may not be changed in response to the white line recognition level as described above.

Further, in the case where the driving support ECU 10 is configured to perform the LTC by using the above Expression (3'), the steering control amount may be a target steering torque Tr* and/or a target yaw rate YRc*. In this configuration, an upper limit value for each of the target steering torque Tr* and the target yaw rate YRc* may be changed in response to the white line recognition level. Further, when the white line recognition level is the Level 1 or the Level 2, the driving support ECU 10 may set the magnitude of the control gain(s) in the above Expression (3') to a value smaller than that used/set when the white line recognition level is the Level 3. Those configurations can also allow the driving support ECU 10 to lower the responsiveness of the LTC when the white line recognition level is the Level 1 or the Level 2.

Guard of Steering Control Amount in LCA

In performing the LCA in place of the LTC which has been performed, when the white line recognition level is the Level 1, the driving support ECU 10 changes/sets the upper limit value of the magnitude of the steering control amount (that is, the upper limit value of the steering control amount for the LCA) to a value smaller than a value which is set as the upper limit value of the steering control amount for the LCA when the white line recognition level is the Level 2 or the Level 3. The driving support ECU 10 limits the steering control amount in such a manner that the magnitude of that steering control amount does not exceed the upper limit value. The driving support ECU 10 performs the steering control (LCA) for changing the steering angle based on the limited steering control amount.

The steering control amount is a parameter to determine/define the steering angle of the own vehicle, and includes at least one of the target steering angle θlcs* or the target steering angular velocity.

In performing the LCA, the driving support ECU 10 adopts the target steering angle θlcs* and the target steering angular velocity as the steering control amounts. When the white line recognition level is the Level 2 or the Level 3, the driving support ECU 10 limits the target steering angle θlcs* in such a manner that the magnitude of the target steering angle θlcs* does not exceed a third steering angle upper limit value $\theta3_{max}$. That is, when the magnitude of the target steering angle θlcs* exceeds the third steering angle upper limit value $\theta3_{max}$, the driving support ECU 10 sets the magnitude of the target steering angle θlcs* to the third steering angle upper limit value $\theta3_{max}$.

Further, when the white line recognition level is the Level 2 or the Level 3, the driving support ECU 10 limits the target steering angular velocity in such a manner that the magnitude of the target steering angular velocity does not exceed a third steering angular velocity upper limit value $d\theta3_{max}$ (>0). The target steering angle θlcs* at a time point a predetermined time period before the current time point is denoted by "$\theta lcs_{old}$", and the target steering angle θlcs* at the current time point is denoted by "$\theta lcs_{now}$". The driving support ECU 10 limits the target steering angle θlcs* as follows. In addition, when the magnitude of the target steering angle θlcs* is limited with the third steering angle upper limit value $\theta3_{max}$ before the following process for limiting (i.e., (2a) or (2b)) becomes effective, the driving support ECU 10 uses that limited value as $\theta lcs_{now}$.

(2a) When $(\theta lcs_{now}-\theta lcs_{old})>d\theta3_{max}$, the driving support ECU 10 sets the target steering angle θlcs* to "$\theta lcs_{old}+d\theta3_{max}$".

(2b) When $(\theta lcs_{old}-\theta lcs_{now})>d\theta3_{max}$, the driving support ECU 10 sets the target steering angle θlcs* to "$\theta lcs_{old}-d\theta3_{max}$".

On the other hand, when the white line recognition level is the Level 1, the driving support ECU 10 limits the target steering angle θlcs* in such a manner that the magnitude of the target steering angle θlcs* does not exceed a fourth steering angle upper limit value $\theta4_{max}$. The fourth steering angle upper limit value $\theta4_{max}$ is smaller than the third steering angle upper limit value $\theta3_{max}$. When the magnitude of the target steering angle θlcs* exceeds the fourth steering angle upper limit value $\theta4_{max}$, the driving support ECU 10 sets the magnitude of the target steering angle θlcs* to the fourth steering angle upper limit value $\theta4_{max}$.

Further, when the white line recognition level is the Level 1, the driving support ECU 10 limits the target steering angular velocity in such a manner that the magnitude of the target steering angular velocity does not exceed a fourth steering angular velocity upper limit value $d\theta4_{max}$(≥0). More specifically, the driving support ECU 10 limits the target steering angle θlcs* as follows. In addition, when the magnitude of the target steering angle θlcs* is limited with the fourth steering angle upper limit value $\theta4_{max}$ before the following process for limiting (i.e., (2c) or (2d)) becomes effective, the driving support ECU 10 uses that limited value as $\theta lcs_{\_now}$.

(2c) When $(\theta lcs_{\_now}-\theta lcs_{\_old})>d\theta 4_{max}$, the driving support ECU 10 sets the target steering angle $\theta lcs*$ to "$\theta lcs_{\_old}+d\theta 4_{max}$".

(2d) When $(\theta lcs_{\_old}-\theta lcs_{\_now})>d\theta 4_{max}$, the driving support ECU 10 sets the target steering angle $\theta lcs*$ to "$\theta lcs_{\_old}-d\theta 4_{max}$".

In this manner, only when the white line recognition level is the Level 1, the driving support ECU 10 performs the steering control (LCA) with a relatively small steering control amount (i.e., a steering control amount having a relatively small magnitude). Meanwhile, when the white line recognition level is the Level 2, the driving support ECU 10 performs the steering control (LCA) with a relatively large steering control amount (i.e., a steering control amount having a relatively large magnitude). Therefore, the driving support ECU 10 can have the own vehicle 100 change lanes from the original lane to the target lane for the predetermined target lane change time period (in other words, within a relatively short time period suitable for changing lanes). Accordingly, the driving support ECU 10 can reduce the possibility that an other vehicle traveling at a high speed in the target lane and approaching from behind the own vehicle comes excessively close to the own vehicle.

It should be noted that the third steering angle upper limit value $\theta 3_{max}$ and/or the third steering angular velocity upper limit value $d\theta 3_{max}$ may be set to very large values (each of the values which exceeds a range that can be taken in the LCA), respectively. In this configuration, when the white line recognition level is the Level 2 or the Level 3, the magnitude of the target steering angle $\theta lcs*$ and/or the magnitude of the target steering angular velocity are substantially/practically not limited.

Further, when the white line recognition level is the Level 1, the driving support ECU 10 may set the magnitude of the control gain(s) in the above Expression (6) to a value smaller than that set/used when the white line recognition level is the Level 2 or the Level 3. This can also allow the driving support ECU 10 to lower the responsiveness of the LCA. In this configuration, the upper limit value of the steering control amount for the LCA may or may not be changed in response to the white line recognition level as described above.

In addition, $\theta 1_{max}$ and $\theta 3_{max}$ may be set to different values from each other or may be set to the same value as each other. $d\theta 1_{max}$ and $d\theta 3_{max}$ may be set to different values from each other or may be set to the same value as each other. Further, $\theta 2_{max}$ and $\theta 4_{max}$ may be set to different values from each other or may set to the same value as each other. $d\theta 2_{max}$ and $d\theta 4_{max}$ may be set to different values from each other or may be set to the same value as each other.

<Specific Operation>

Next, a specific operation of the CPU (hereinafter, simply referred to as the "CPU") of the driving support ECU 10 will be described. The CPU is configured or programmed to perform the ACC in accordance with a routine (not shown). The CPU is configured or programmed to execute a routine shown in FIG. 9 while the ACC is being performed.

Therefore, while the ACC is being performed, at a certain timing, the CPU starts a process of Step 900 in FIG. 9 and then, proceeds to Step 905 to determine whether or not a predetermined execution condition is satisfied.

The predetermined execution condition is satisfied when all of the following conditions 1 to 3 are satisfied.

(condition 1): One or both of the left and right white lines LL and RL of the travel lane 201 have been recognized by the camera sensor 16*b* at least in the vicinity of the own vehicle 100.

(condition 2): The preceding vehicle (ACC-target vehicle) 110 is present in a front area of (ahead of) the own vehicle 100.

(condition 3): The CPU is performing the LTC in accordance with the target traveling line set based on the first center line LM1 of the travel lane 201.

When the execution condition is not satisfied, the CPU makes a "No" determination at Step 905, and then, proceeds directly to Step 995 to tentatively terminate the present routine.

On the other hand, when the execution condition is satisfied, the CPU makes a "Yes" determination at Step 905, and sequentially executes processes of Steps 910 and 920 described below. Thereafter, the CPU proceeds to Step 925.

(Step 910): The CPU stores in the RAM the target object information on each target object, based on the target object information transmitted from the ambient sensor 16. The CPU acquires the position information corresponding to the preceding vehicle 110 (i.e., x-y coordinate values of the preceding vehicle 110) from the target object information. The CPU obtains/calculates the preceding vehicle trajectory L1 by executing the curve fitting process with respect to the position information on the preceding vehicle 110, as described above.

(Step 915): The CPU recognizes a pair of the left white line LL and the right white line RL which define the travel lane 201 in which the own vehicle 100 is currently traveling, based on the information from the ambient sensor 16 (i.e., the information which has been recognized by the camera sensor 16*b*). The CPU extrapolates a line connecting the "center positions between the recognized pair of the white lines LL and RL", and determines/defines the extrapolated line as "the first center line LM1" In the same manner, the CPU recognizes a pair of the left white line RL and the right white line RR which define the adjacent lane (target lane) 202, based on the information from the ambient sensor 16 (i.e., the information which has been recognized by the camera sensor 16*b*). The CPU extrapolates a line connecting the "center positions between the recognized pair of the white lines RL and RR", and determines/defines the extrapolated line as "the second center line LM2". It should be noted that, when the CPU has recognized only one of the left white line LL and the right white line RL of the travel lane 201, the CPU extrapolates the first center line LM1 and the second center line LM2 based on the recognized white line, as described above.

(Step 920): The CPU executes a "white line recognition determination routine" which is described later and is shown in FIG. 10 to thereby determine whether the white line recognition level is the Level 1, the Level 2, or the Level 3.

Next, at Step 925, the CPU determines whether or not a predetermined LCA start condition is satisfied. The LCA start condition is satisfied when all of the following conditions 4 to 6 are satisfied.

(condition 4): The driver is requesting the lane change assist control (In other words, an elapsed time since the lane change assist request was generated is equal to or longer than the predetermined assist request confirmation time).

(condition 5): None of obstacles (that is, other vehicles) has been detected in the target lane by the ambient sensor 16.

(condition 6): The vehicle speed SPD is within a predetermined speed range.

Now, it is assumed that the LCA start condition is not satisfied. In this situation, the CPU makes a "No" determination at Step 925, and sequentially executes processes of Steps 930 and 935 described below.

(Step 930): The CPU sets the target traveling line based on the first center line LM1.

(Step 935): the CPU calculates the target lane information (the curvature CL, the yaw angle θL, and the lateral difference dL) based on the first center line LM1. Further, the CPU applies the target lane information to the Expression (3) to thereby calculate the target steering angle θ*.

Next, at Step 940, the CPU determines whether the white line recognition level is the Level 1 or the Level 2. Now, it is assumed that the white line recognition level is the Level 1 or the Level 2. In this situation, the CPU makes a "Yes" determination at Step 940, and proceeds to Step 945. At Step 945, the CPU performs the steering control (LTC) with a relatively small steering control amount (i.e., a steering control amount having a relatively small magnitude), as described above. That is, the CPU sets the upper limit value of the steering control amount for the LTC to a value ($\theta 2_{max}$ and $d\theta 2_{max}$) smaller than that used/set when the white line recognition level is the Level 3. Then, the CPU proceeds to Step 995 to tentatively terminate the present routine.

On the other hand, it is assumed that the white line recognition level is the Level 3 at Step 940. In this situation, the CPU makes a "No" determination at Step 940, and proceeds to Step 950. At Step 950, the CPU performs the steering control (LTC) with a relatively large steering control amount (i.e., a steering control amount having a relatively large magnitude), as described above. That is, the CPU sets the upper limit value of the steering control amount for the LTC to a value ($\theta 1_{max}$ and $d\theta 1_{max}$) larger than that used/set when the white line recognition level is the Level 1 or the Level 2. Then, the CPU proceeds to Step 995 to tentatively terminate the present routine.

Now, it is assumed that the driver requests the lane change assist control when a predetermined time period has elapsed under this situation. In this case, at the certain timing, the CPU resumes the process from Step 900 and proceeds to Step 905. When the above-described predetermined execution condition is satisfied, the CPU makes a "Yes" determination at Step 905, and sequentially executes the processes of Steps 910 to 920. Then, the CPU proceeds to Step 925.

Now, it is further assumed that the LCA start condition is satisfied. In this situation, the CPU makes a "Yes" determination at Step 925, and sequentially executes processes of Steps 955 to 960 described below.

(Step 955): the CPU calculates the target trajectory for the LCA as described above.

(Step 960): the CPU calculates the lane information (the curvature CL, the yaw angle θL, the lateral difference dL, and the like), and applies the lane information to the Expression (6) to thereby calculate the target steering angle θlcs*.

Next, at Step 965, the CPU determines whether or not the white line recognition level is the Level 1. When the white line recognition level is the Level 1, the CPU makes a "Yes" determination at Step 965, and proceeds to Step 970. At Step 970, the CPU performs the steering control (LCA) with a relatively small steering control amount (i.e., a steering control amount having a relatively small magnitude), as described above. That is, the CPU sets the upper limit value of the steering control amount for the LCA to a value ($\theta 4_{max}$ and $d\theta 4_{max}$) lower than that used/set when the white line recognition level is the Level 2 or the Level 3.

Thereafter, the CPU proceeds to Step 980, and determines whether or not a predetermined LCA termination condition is satisfied. The LCA termination condition is satisfied when at least one of the following conditions 7 and 8 is satisfied.

(condition 7): The own vehicle 100 has reached the final target lateral position.

(condition 8): The driver has performed a specific operation for canceling the LCA (e.g., a specific operation of the steering wheel SW).

When the LCA termination condition is not satisfied, the CPU returns to Step 960, and repeatedly executes the processes of Steps 960 to 970 until the LCA termination condition becomes satisfied. In contrast, when the LCA termination condition is satisfied, the CPU makes a "Yes" determination at Step 980, and executes a predetermined termination process at Step 985. The termination process includes a process for turning off the flashing of the turn signal 51. Thereafter, the CPU proceeds to Step 995 to tentatively terminate the present routine.

On the other hand, it is assumed that the white line recognition level is other than the Level 1 (that is, the white line recognition level is the Level 2 or the Level 3) at Step 965. In this situation, the CPU makes a "No" determination at Step 965 to proceed to Step 975. At Step 975, the CPU performs the steering control (LCA) with a relatively large steering control amount (i.e., a steering control amount having a relatively large magnitude), as described above. That is, the CPU sets the upper limit value of the steering control amount for the LCA to a value ($\theta 3_{max}$ and $d\theta 3_{max}$) larger than that used/set when the white line recognition level is the Level 1.

Then, the CPU proceeds to Step 980, and determines whether or not the predetermined LCA termination condition is satisfied. When the LCA termination condition is not satisfied, the CPU returns to Step 960, and repeatedly executes the processes of Steps 960 to 970 until the LCA termination condition becomes satisfied. On the other hand, when the LCA termination condition is satisfied, the CPU makes a "Yes" determination at Step 980, and executes the predetermined termination process at Step 985. Then, the CPU proceeds to Step 995 to tentatively terminate the present routine.

Next, with reference to a flowchart shown in FIG. 10, the "white line recognition accuracy determination routine" which is executed by the CPU at Step 920 will be described. When the CPU proceeds to Step 920, the CPU starts the routine shown in FIG. 10 from Step 1000 to proceeds to Step 1010. At Step 1010, the CPU determines whether or not both of a pair of the left white line LL and the right white line RL which define the travel lane 201 have been recognized.

When only either the left white line LL or the right white line RL has been recognized, the CPU makes a "No" determination at Step 1010, and proceeds to Step 1020. At Step 1020, the CPU determines that the current white line recognition accuracy corresponds to the Level 2 to thereby set the white line recognition level to the Level 2. Next, the CPU proceeds to Step 925 shown in FIG. 9 through Step 1095.

In contrast, when both of a pair of the left white line LL and the right white line RL have been recognized, the CPU makes a "Yes" determination at Step 1010, and proceeds to Step 1030. At Step 1030, the CPU determines whether or not the first distance change amount is equal to or larger than the first predetermined threshold Th1. The first distance change amount is the magnitude (|dL2−dL1|) of the amount of change between the first center distance dL1 at the previous calculation timing and the first center distance dL2 at the current calculation timing.

When the first distance change amount (|dL2−dL1|) is equal to or larger than the first predetermined threshold Th1, the CPU makes a "Yes" determination at Step 1030, and proceeds to Step 1040. At Step 1040, the CPU determines whether or not the second distance change amount is equal to or smaller than the second predetermined threshold Th2. The second distance change amount is the magnitude (|dv2−dv1|) of the amount of change between the second center distance dv1 at the previous calculation timing and the second center distance dv2 at the current calculation timing. When the second distance change amount (|dv2−dv1|) is equal to or smaller than the second predetermined threshold Th2, the CPU makes a "Yes" determination at Step 1040, and proceeds to Step 1050. At Step 1050, the CPU determines that the current white line recognition accuracy corresponds to the Level 1 to thereby set the white line recognition level to the Level 1. Next, the CPU proceeds to Step 925 shown in FIG. 9 through Step 1095.

On the other hand, at Step 1030, when the first distance change amount (|dL2−dL1|) is smaller than the first predetermined threshold Th1, the CPU makes a "No" determination, and proceeds to Step 1060. Further, at Step 1040, when the second distance change amount (|dv2−dv1|) is larger than the second predetermined threshold Th2, the CPU makes a "No" determination, and proceeds to Step 1060. When the CPU proceeds to Step 1060, the CPU determines that the current white line recognition accuracy corresponds to the Level 3 to thereby set the white line recognition level to the Level 3. Next, the CPU proceeds to Step 925 shown in FIG. 9 through Step 1095.

As described above, when performing the LTC, in response to the level (white line recognition level) of the reliability with respect to the recognition result of the white lines, the embodiment apparatus changes the responsiveness (steering control amount) of the LTC for/when having the position and direction of the own vehicle match up with (become equal to) the target traveling line. Specifically, when the white line recognition level is the Level 1 or the Level 2, the embodiment apparatus lowers the responsiveness of the LTC as compared with the responsiveness of the LTC when the white line recognition level is the Level 3. Therefore, in performing the LTC, when the recognition accuracy of the white lines (that is, the reliability of the center line) is low, the embodiment apparatus can prevent a sudden change of the position in the lane-width direction of the own vehicle, and a sudden change of the direction of the own vehicle. Accordingly, the own vehicle can be made to travel in the travel lane stably.

Further, when performing the LCA, in response to the level (white line recognition level) of the reliability for the recognition result of the white lines, the embodiment apparatus changes the responsiveness (steering control amount) of the LCA for/when having the position and direction of the own vehicle match up with (become equal to) the target trajectory. Specifically, only when it is determined that the white line(s) has been misrecognized (that is, the white line recognition level is the Level 1), the embodiment apparatus lowers the responsiveness of the LCA. This makes the driver feel/find that the responsiveness of the LCA is low, and thus, the driver can recognize that the embodiment apparatus has misrecognized the white line(s). In this case, the driver can cancel the LCA by the specific operation (Step 980: Yes). On the other hand, when the reliability for the recognition result of the white lines corresponds to the level including the possibility of misrecognition (that is, the white line recognition level is the Level 2), the embodiment apparatus does not lower the responsiveness of the LCA. Therefore, when the white line recognition level is the Level 2, the time period for which the own vehicle moves from the original lane to the target lane does not become long. Accordingly, the embodiment apparatus can reduce the possibility that an other vehicle traveling at a high speed in the target lane in the rear area of the own vehicle comes fairly/excessively close to the own vehicle. Accordingly, the safety in the LCA can be further enhanced.

Further, the embodiment apparatus determines the recognition accuracy of the white lines to decide the white line recognition level, based on the first distance change amount (|dL2−dL1|) and the second distance change amount (|dv2−dv1|). Therefore, the embodiment apparatus can determine whether a pair of the white lines LL and RL of the travel lane 201 have been misrecognized.

The present disclosure is not limited to the above-mentioned embodiment(s), and various changes can be adopted within the scope of the present disclosure.

For example, at Step 910, the CPU may calculate/produce the preceding vehicle trajectory L1 by using the Kalman filter. More specifically, the driving support ECU 10 includes the Kalman filter. The CPU inputs/applies to the Kalman filter the position information of the own vehicle and the position information of the preceding vehicle stored in the RAM. In response to those inputs, the Kalman filter outputs (i) the curvature of the preceding vehicle trajectory L1 at a position corresponding to the current position of the own vehicle 100, (ii) the change ratio of the curvature of the preceding vehicle trajectory L1, (iii) the yaw angle of the own vehicle 100 with respect to the preceding vehicle trajectory L1, and (iv) the distance between the current position of the own vehicle 100 and the preceding vehicle trajectory L1. The CPU can obtain the coefficients a, b, c, and d of the cubic function f(x) based on the relationship shown in FIG. 5C (that is, the relationship among the coefficients (a, b, c, and d) of the cubic function f(x), the curvature, the yaw angle and the like).

The embodiment apparatus can be applied to an apparatus which performs the LTC by using the corrected preceding vehicle trajectory L2. In this apparatus using the trajectory L2, the CPU may calculate/produce the trajectory L2 through correcting/modifying the preceding vehicle trajectory L1 with the first center line LM1 at Step 930.

Further, at Step 1030, in place of the first distance change amount (|dL2−dL1|), the CPU may use a magnitude of a change amount of the yaw angle θL (see FIG. 2) in a predetermined second time period. The yaw angle θL is a yaw angle formed between the direction of the first center line LM1 and the traveling direction of the own vehicle 100. Hereinafter, the yaw angle θL is referred to as a "first yaw angle". For example, as illustrated in FIG. 7B, in the case where the curb LC has been misrecognized as the white line, the first center line LM1' curves toward the curb LC at the portion where the misrecognition has occurred, and therefore, the first yaw angle θL becomes larger. In view of this, the first yaw angle θL can be used in a condition for determining whether or not the misrecognition of the white line(s) has occurred. More specifically, the CPU calculates a first angle change amount (|θL2−θL1|) which is a magnitude of the amount of change between the first yaw angle θL1 at the previous calculation timing and the first yaw angle θL2 at the current calculation timing. In other words, the first angle change amount (|θL2−θL1|) is the magnitude of the amount of change in the first yaw angle θL in the second predetermined time period. The CPU determines whether or not the first angle change amount ($|\theta L2-\theta L1|$) is equal to or larger than a predetermined third threshold Th3. When the first angle change amount ($|\theta L2-\theta L1|$) is equal to or larger than the predetermined third threshold Th3, the CPU proceeds to Step 1040. In contrast, when the first angle change amount ($|\theta L2-\theta L1|$) is smaller than the predetermined third threshold Th3, the CPU proceeds to Step 1060.

At Step 1040, in place of the second distance change amount ($|dv2-dv1|$), the CPU may use a magnitude of change amount of the yaw angle θv (see FIG. 5A) in the predetermined second time period. The yaw angle θy is a yaw angle formed between the direction of the preceding vehicle trajectory L1 and the traveling direction of the own vehicle 100. Hereinafter, the yaw angle θy is referred to as a "second yaw angle". More specifically, the CPU calculates a second angle change amount ($|\theta v2-\theta v1|$) which is a magnitude of the amount of change between the second yaw angle θv1 at the previous calculation timing and the second yaw angle θv2 at the current calculation timing. In other words, the second angle change amount ($|\theta v2-\theta v1|$) is the magnitude of the amount of change in the second yaw angle θy in the second predetermined time period. The CPU determines whether or not the second angle change amount ($|\theta v2-\theta v1|$) is equal to or smaller than a predetermined fourth threshold Th4. When the second angle change amount ($|\theta v2-\theta v1|$) is equal to or smaller than the predetermined fourth threshold Th4, the CPU proceeds to Step 1050. On the other hand, when the second angle change amount ($|\theta v2-\theta v1|$) is larger than the predetermined fourth threshold Th4, the CPU proceeds to Step 1060.

Further, at Step 1030, the CPU may use both of the first distance change amount and the first angle change amount. In this configuration, when the first distance change amount ($|dL2-dL1|$) is equal to or larger than the first threshold Th1 and the first angle change amount ($|\theta L2-\theta L1|$) is equal to or larger than the third threshold Th3, the CPU proceeds to Step 1040. On the other hand, when the first distance change amount ($|dL2-dL1|$) is smaller than the first threshold Th1 and/or the first angle change amount ($|\theta L2-\theta L1|$) is smaller the third threshold Th3, the CPU proceeds to Step 1060.

Further, at Step 1040, the CPU may use both of the second distance change amount and the second angle change amount. In this configuration, when the second distance change amount ($|dv2-dv1|$) is equal to or smaller than the second threshold Th2 and the second angle change amount ($|\theta v2-\theta v1|$) is equal to or smaller than the fourth threshold Th4, the CPU proceeds to Step 1050. On the other hand, when the second distance change amount ($|dv2-dv1|$) is larger than the second threshold Th2 and/or the second angle change amount ($|\theta v2-\theta v1|$) is larger than the fourth threshold Th4, the CPU proceeds to Step 1060.

The embodiment apparatus is configured to perform the LTC and the LCA only while the ACC is being performed. However, the embodiment apparatus may be configured to perform the LTC and the LCA even in a case where the ACC is not being performed.

What is claimed is:

1. A driving support apparatus for a vehicle comprising:
   a lane line recognition unit configured to recognize a pair of lane lines which define a travel lane in which the vehicle is traveling, and a second pair of lane lines which define an adjacent lane which is adjacent to the travel lane, and to extrapolate a first center line connecting center positions between the pair of lane lines which define the travel lane, and a second center line connecting center positions between the pair of lane lines which define the adjacent lane;
   a determination unit configured to determine a reliability with respect to a recognition result of the pair of lane lines which define the travel lane;
   a lane keeping assist control unit configured to perform a lane keeping assist control for changing a steering angle of the vehicle in such a manner that the vehicle travels along a target traveling line which is set based on at least the first center line; and
   a lane change assist control unit configured to perform a lane change assist control for changing the steering angle of the vehicle in such a manner that the vehicle changes lanes from the travel lane to the adjacent lane along a target trajectory which is set based on the first center line and the second center line,
   wherein, when the reliability determined by the determination unit is a predetermined level, the lane keeping assist control unit is configured to lower a steering control amount of the lane keeping assist control for having a position of the vehicle and a traveling direction of the vehicle match up with the target traveling line, compared with the steering control amount of the lane keeping assist control when the reliability is a level higher than the predetermined level,
   wherein, when the reliability determined by the determination unit is a level lower than the predetermined level, the lane change assist control unit is configured to lower a steering control amount of the lane change assist control for having the position of the vehicle and the traveling direction of the vehicle match up with the target trajectory, compared with the steering control amount of the lane change assist control when the reliability is the predetermined level, and
   wherein the determination unit is further configured to:
   when the lane line recognition unit has misrecognized one or both of the pair of lane lines which define the travel lane, determine that the reliability is a first level;
   when the lane line recognition unit has recognized only one of the pair of lane lines which define the travel lane, determine that the reliability is a second level; and
   when the lane line recognition unit has correctly recognized the pair of lane lines which define the travel lane, determine that the reliability is a third level,
   wherein the lane keeping assist control unit is configured to, when the determination unit determines that the reliability is the first level or the second level, lower the steering control amount of the lane keeping assist control for having the position of the vehicle and the direction of the vehicle match up with the target traveling line, compared with the steering control amount of the lane keeping assist control when the determination unit determines that the reliability is the third level, and
   wherein the lane change assist control unit is configured to, when the determination unit determines that the reliability is the first level, lower the steering control amount of the lane change assist control for having the position the vehicle and the direction of the vehicle match up with the target trajectory, compared with the steering control amount of the lane change assist control when the determination unit determines that the reliability is the second level or the third level.

2. The driving support apparatus according to claim 1, further comprising a preceding vehicle trajectory obtaining unit configured to extrapolate a traveling trajectory of a preceding vehicle traveling in the travel lane and ahead of the own vehicle the vehicle,
- wherein, while the lane keeping assist control is being performed, the determination unit is configured to determine the reliability based on:
- one or both of (i) a first distance change amount which is a magnitude of change amount of a distance in a lane-width direction between the first center line and the vehicle in a first predetermined time period, and (ii) a first angle change amount which is a magnitude of change amount of an angle of deviation formed between a direction of the first center line and the traveling direction of the vehicle in a second predetermined time period; and
- one or both of (i) a second distance change amount which is a magnitude of change amount of a distance in the lane-width direction between the traveling trajectory and the vehicle in the first predetermined time period, and (ii) a second angle change amount which is a magnitude of change amount of an angle of deviation formed between a direction of the traveling trajectory and the traveling direction of the vehicle in the second predetermined time period.

* * * * *